(12) United States Patent
Wu et al.

(10) Patent No.: US 12,349,206 B2
(45) Date of Patent: Jul. 1, 2025

(54) SECURE RANDOM ACCESS PROCEDURE

(71) Applicant: APPLE INC., Cupertino, CA (US)

(72) Inventors: Zhibin Wu, Los Altos, CA (US); Fangli Xu, Beijing (CN); Haijing Hu, Los Gatos, CA (US); Naveen Kumar R. Palle Venkata, San Diego, CA (US); Pavan Nuggehalli, San Carlos, CA (US); Ralf Rossbach, Munich (DE); Sarma V. Vangala, Campbell, CA (US); Shu Guo, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/442,038

(22) PCT Filed: Jul. 1, 2021

(86) PCT No.: PCT/CN2021/104113
§ 371 (c)(1),
(2) Date: Sep. 22, 2021

(87) PCT Pub. No.: WO2023/272705
PCT Pub. Date: Jan. 5, 2023

(65) Prior Publication Data
US 2024/0032115 A1 Jan. 25, 2024

(51) Int. Cl.
*H04W 74/08* (2024.01)
*H04W 74/0833* (2024.01)
(52) U.S. Cl.
CPC .............................. *H04W 74/0841* (2013.01)

(58) Field of Classification Search
CPC ................................................ H04W 74/0841
See application file for complete search history.

(56) References Cited

U.S. PATENT DOCUMENTS

| | | | |
|---|---|---|---|
| 2013/0301611 A1* | 11/2013 | Baghel | H04W 74/0833 370/329 |
| 2017/0295489 A1* | 10/2017 | Agiwal | H04W 12/0433 |
| 2018/0110074 A1 | 4/2018 | Akkarakaran et al. | |
| 2020/0008240 A1* | 1/2020 | Golitschek Edler von Elbwart ... H04W 74/0833 | |
| 2020/0100088 A1* | 3/2020 | Kim | H04W 48/16 |
| 2020/0120713 A1 | 4/2020 | Yerramalli et al. | |
| 2020/0314917 A1 | 10/2020 | Jeon et al. | |
| 2021/0168874 A1 | 6/2021 | Wei et al. | |
| 2021/0204129 A1 | 7/2021 | Yang et al. | |

(Continued)

FOREIGN PATENT DOCUMENTS

| | | |
|---|---|---|
| CN | 111867124 | 10/2020 |
| CN | 112335272 | 2/2021 |

(Continued)

OTHER PUBLICATIONS

Article entitled, "Stealth Pirating Attack by Rach Rebroadcast Overwriting (SPARROW)", GSMA CVD, 3GPP TSG RAN WG2#114-e, R2-2106454, dated May 27, 2021 in 4 pages.

(Continued)

*Primary Examiner* — Atique Ahmed
(74) *Attorney, Agent, or Firm* — Kilpatrick Townsend & Stockton LLP

(57) ABSTRACT

The present application relates to devices and components including apparatus, systems, and methods for secure random access in wireless communication systems.

17 Claims, 17 Drawing Sheets

(56) References Cited

U.S. PATENT DOCUMENTS

| | | | | |
|---|---|---|---|---|
| 2022/0095383 A1* | 3/2022 | Huang | | H04W 74/0833 |
| 2022/0141880 A1* | 5/2022 | Wu | | H04W 74/004 |
| | | | | 370/328 |
| 2022/0159737 A1* | 5/2022 | Jeon | | H04W 56/005 |
| 2022/0174724 A1* | 6/2022 | Babaei | | H04W 72/0446 |
| 2022/0174744 A1* | 6/2022 | Lin | | H04W 8/26 |

FOREIGN PATENT DOCUMENTS

| | | | | |
|---|---|---|---|---|
| CN | 113055931 | | 6/2021 | |
| EP | 4040910 A1 * | | 8/2022 | H04W 74/0833 |
| WO | WO-2021068237 A1 * | | 4/2021 | H04W 74/08 |

OTHER PUBLICATIONS

International Search Report and Written Opinion issued in PCT Application No. PCT/CN2021/104113, dated Mar. 28, 2022 in 12 pages.

Invitation to Pay Additional Fees and, Where Applicable Protest Fee issued in PCT Application No. PCT/CN2021/104113, dated Dec. 20, 2021 in 2 pages.

Technical Specification entitled, "Medium Access Control (MAC) protocol specification (3GPP TS 38.321 version 16.4.0 Release 16)," 5G; NR; ETSI TS 138 321 V16.4.0 (Apr. 2021) in 159 pages. [cited for Section 5.1].

Technical Specification entitled, "NR and NG-RAN Overall description; Stage-2 (3GPP TS 38.300 version 16.5.0 Release 16)," 5G; NR; ETSI TS 138 300 V16.5.0 (Apr. 2021) in 153 pages. [cited for Sections 5.3.4 and 9.2.6].

Technical Specification entitled, "Physical layer procedures for control (3GPP TS 38.213 version 16.5.0 Release 16)," 5G; NR; ETSI TS 138 213 V16.5.0 (Apr. 2021) in 188 pages. [cited for Section 8.4].

Kim, et al., IEEE Network, Nov. 2020 (preprint), "Two-Step Random Access for 5G System: Latest Trends and Challenges," in 7 pages.

Revised 3GPP™ Work Item Description, entitled "Revised work item proposal: 2-step RACH for NR," ZTE Corporation, Sanechips, 3GPP TSG RAN Meeting #83, RP-190711, revision of RP-190128, Shenzhen, China, Mar. 18-21, 2019 in 4 pages.

* cited by examiner

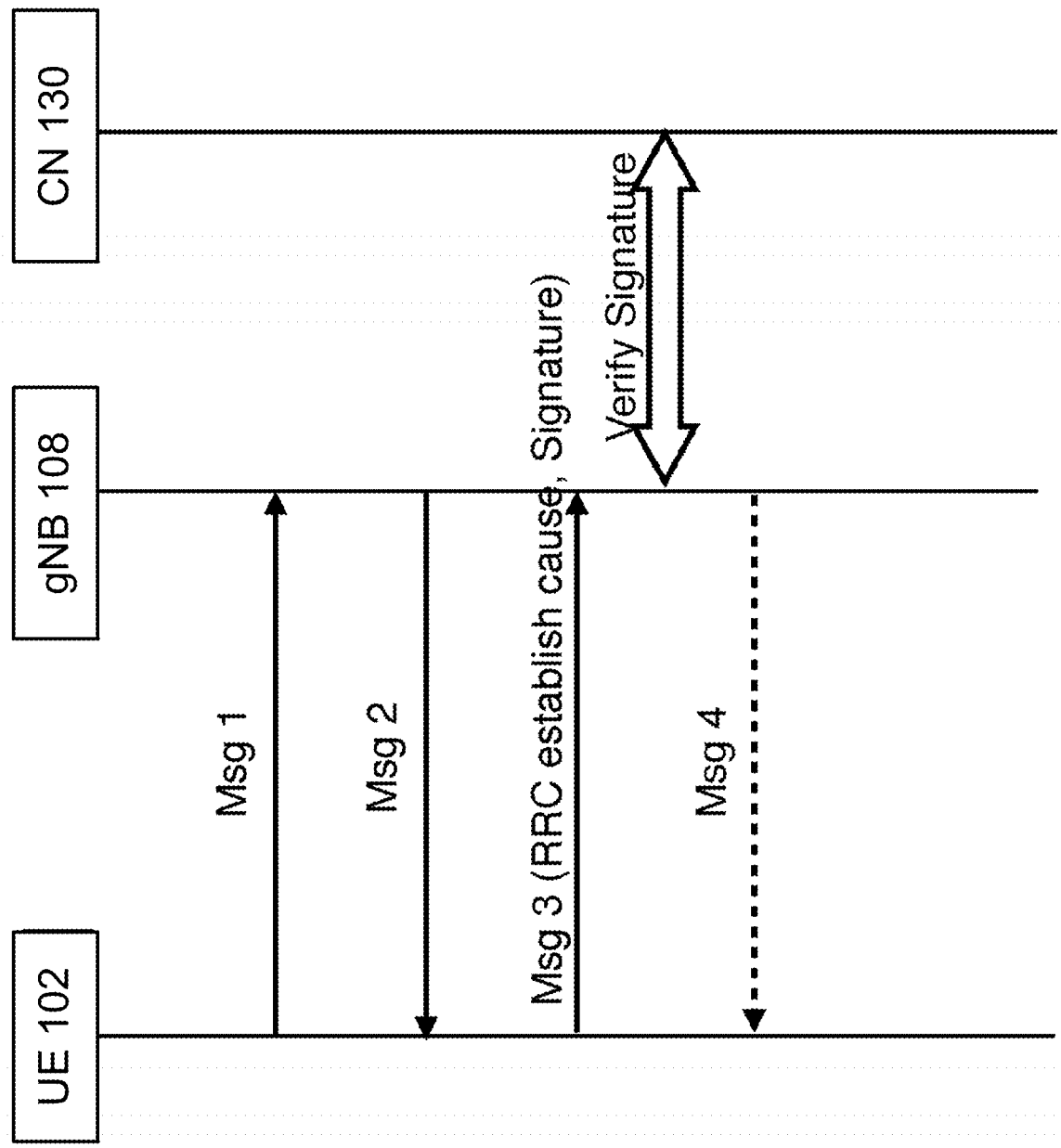

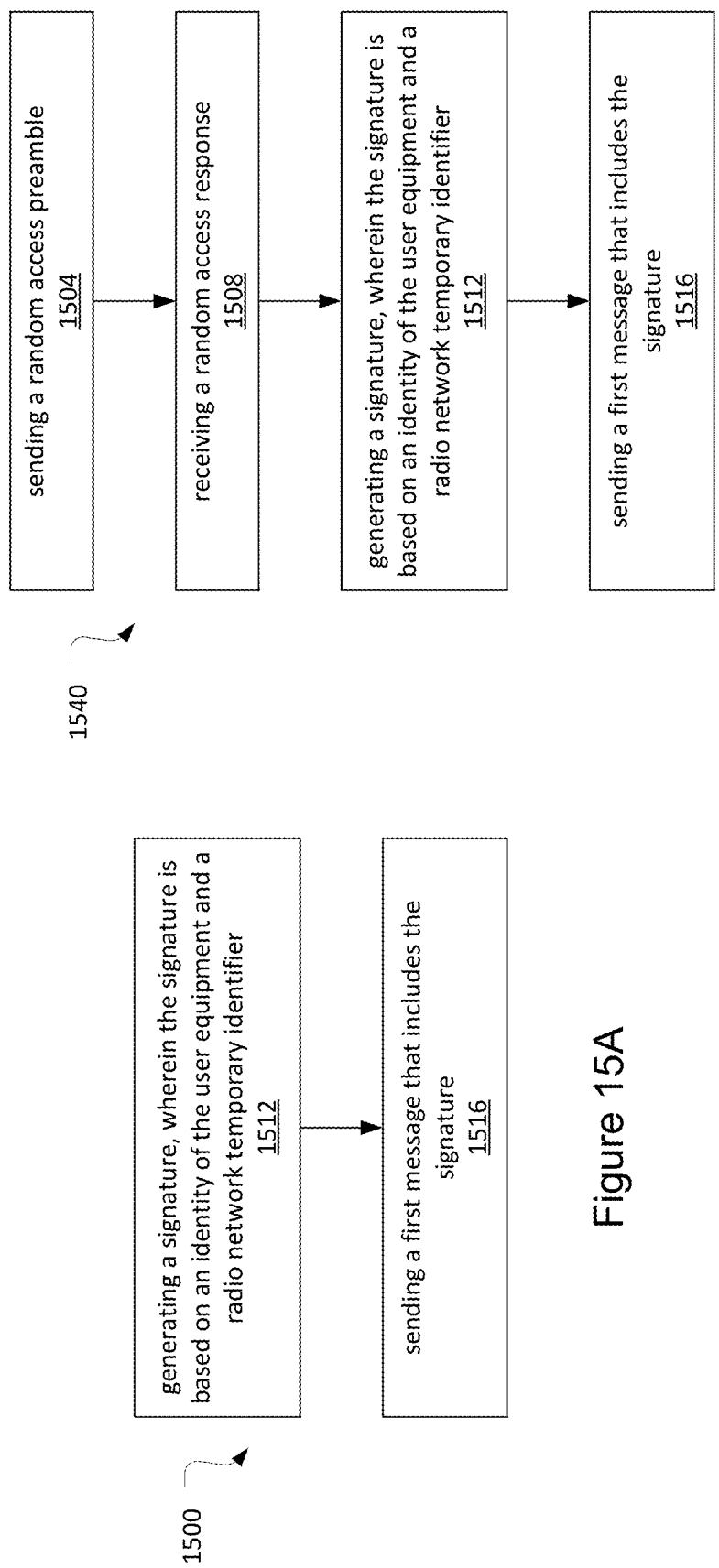

US 12,349,206 B2

SECURE RANDOM ACCESS PROCEDURE

This application is a 35 U.S.C. § 371 National Stage Entry of International Application No. PCT/CN2021/104113, filed on Jul. 1, 2021, which is incorporated herein by reference in its entirety for all purposes

BACKGROUND

Third Generation Partnership Project (3GPP) Fifth Generation (5G) New Radio (NR) networks use two-step or four-step random access (RA) procedures to permit user equipments (e.g., handsets) to negotiate access to the network.

BRIEF DESCRIPTION OF THE DRAWINGS

FIG. 13 shows a signaling diagram for a user equipment-identity-based technique in accordance with some embodiments.

FIG. 15A illustrates an operational flow/algorithmic structure in accordance with some embodiments.

FIG. 15B illustrates an operational flow/algorithmic structure in accordance with some embodiments.

DETAILED DESCRIPTION

Figure 1:
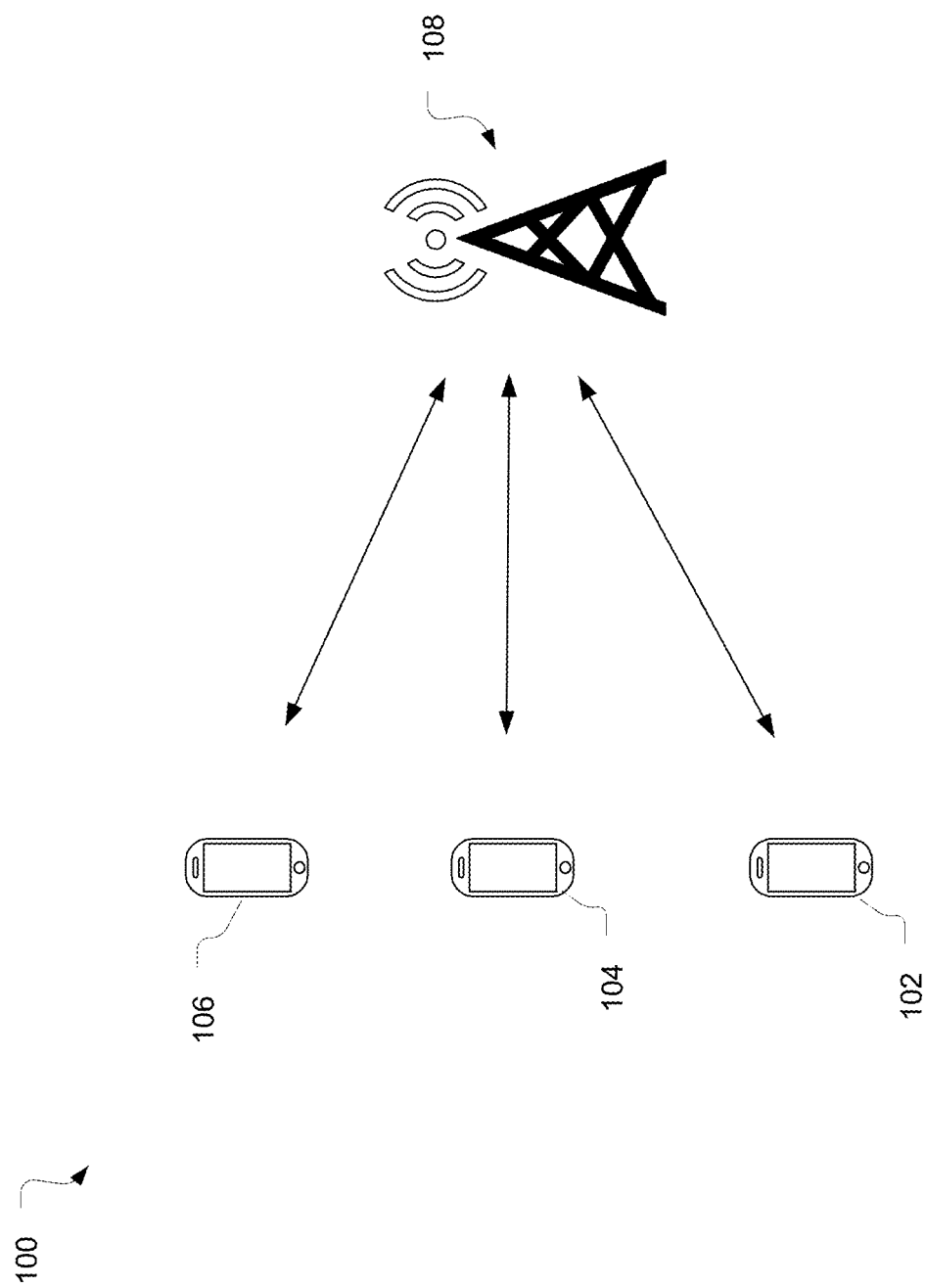
FIG. 1 shows a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

Techniques for preventing pirate broadcasting attacks in a random access (RA) procedure are described herein, with respect to both two-step and four-step RA procedures. FIG. 1 illustrates a network environment 100 in accordance with some embodiments. The network environment 100 may include user equipments (UEs) 102, 104, 106 and an access node 108. The access node 108 may be a base station that provides one or more wireless access cells, for example, 3GPP New Radio (NR) cells, through which one or more of the UEs 102/104/106 may communicate with the access node 108 (e.g., over an NR-Uu interface). In some aspects, the access node 108 is a Next Generation NodeB (gNB) that provides one or more 3GPP NR cells.

The access node 108 may transmit information (for example, data and control signaling) in the downlink direction by mapping logical channels on the transport channels, and transport channels onto physical channels. The logical channels may transfer data between a radio link control (RLC) and media access control (MAC) layers; the transport channels may transfer data between the MAC and PHY layers; and the physical channels may transfer information across the air interface. The physical channels may include a physical broadcast channel (PBCH); a physical downlink shared channel (PDSCH); and a physical downlink control channel (PDCCH).

The PBCH may be used to broadcast system information that the UEs 102/104/106 may use for initial access to a serving cell. The PBCH may be transmitted along with physical synchronization signals (PSS) and secondary synchronization signals (SSS) in a synchronization signal (SS)/PBCH block. The SS/PBCH blocks (SSBs) may be used by the UE 102/104/106 during a cell search procedure and for beam selection.

The PDSCH may be used to transfer end-user application data, signaling radio bearer (SRB) messages, system information messages (other than, for example, a Master Information Block (MIB)), and paging messages.

The access node 108 may use a PDCCH to transmit downlink control information (DCI) to the UEs 102/104/106. The DCI may provide uplink resource allocations on a physical uplink shared channel (PUSCH), downlink resource allocations on a PDSCH, and various other control information. The DCI may also be used to provide uplink power control commands, configure a slot format, or indicate that preemption has occurred.

The access node (e.g., base station or gNB) 108 may also transmit various reference signals to the UEs 102/104/106. A Reference Signal (RS) is a special signal that exists only at PHY layer and is not for delivering any specific information (e.g., data), but whose purpose instead is to deliver a reference point for transmitted power. The reference signals may include demodulation reference signals (DMRSs) for the PBCH, PDCCH, and PDSCH. The UE 104 may compare a received version of the DMRS with a known DMRS sequence that was transmitted to estimate an impact of the propagation channel. The UE 102/104/106 may then apply an inverse of the propagation channel during a demodulation process of a corresponding physical channel transmission.

The reference signals may also include channel state information-reference signals (CSI-RS). The CSI-RS may be a multi-purpose downlink transmission that may be used for CSI reporting, beam management, connected mode mobility, radio link failure detection, beam failure detection and recovery, and fine tuning of time and frequency synchronization. For example, the SSBs and CSI-RSs may be measured by the UE 102/104/106 to determine the desired downlink beam pair for transmitting/receiving PDCCH and physical downlink shared channel (PDSCH) transmissions. The UE may use a Physical Uplink Control Channel (PUCCH) to transmit uplink control information (UCI) to the access node 108, including, for example, hybrid-automatic repeat request (HARQ) acknowledgements, scheduling requests, and periodic and semi-persistent channel state information (CSI) reports.

Figure 2:
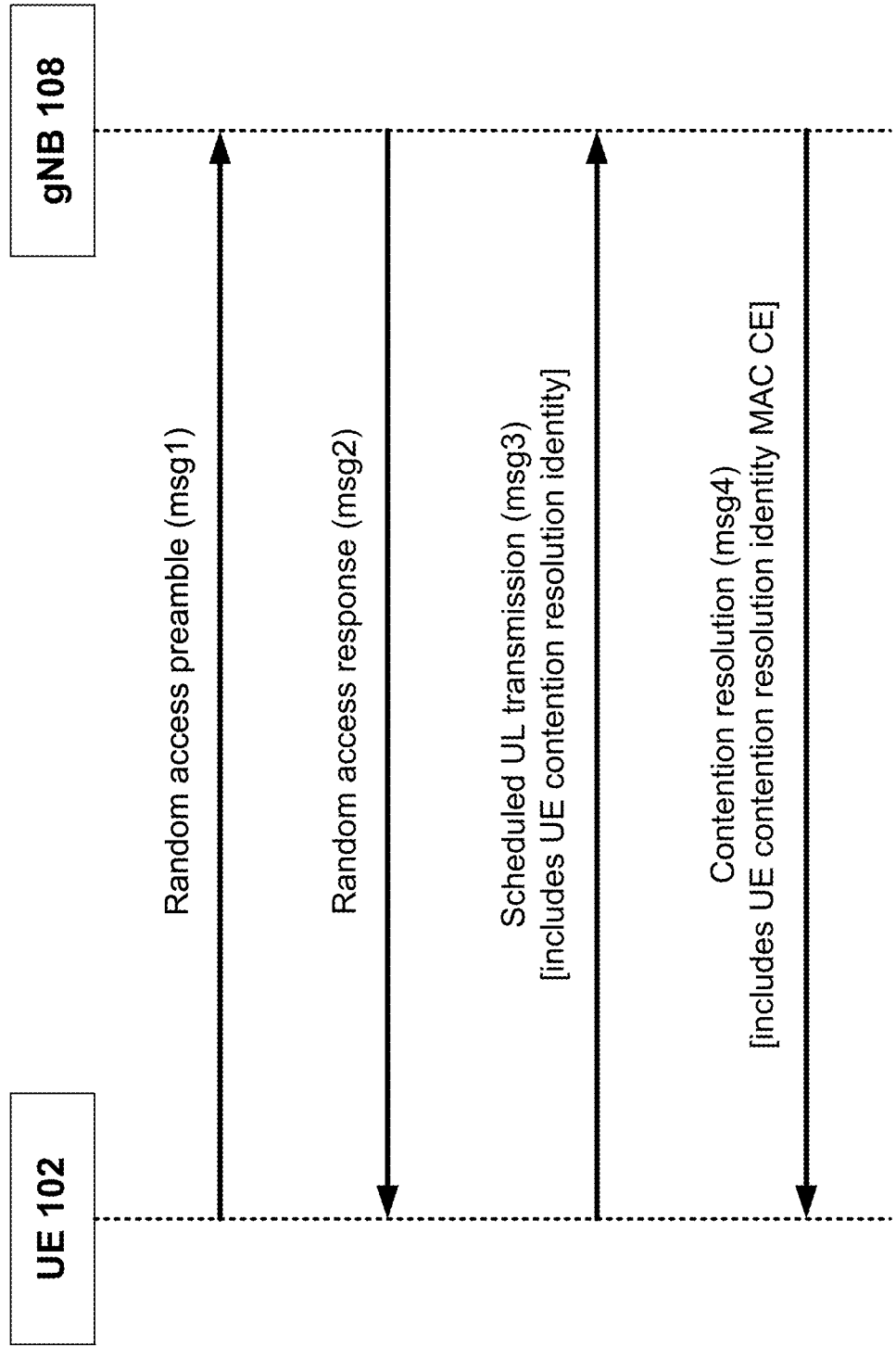
FIG. 2 shows a signaling diagram for a four-step random access (RA) procedure.

In NR, the Random Access (RA) procedure is the initial step for a UE to establish a connection to cell services. In this RA procedure, the UE and the network have not yet authenticated each other. FIG. 2 shows a signaling diagram for a four-step RA procedure (as described in, e.g., section 9.2.6 of 3GPP Technical Specification (TS) 38.300 v16.5.0 (2021 April)) between UE 102 and gNB 108. UE 102 transmits a random access preamble (Msg1) (e.g., over a physical random access channel (PRACH)). In response to receiving such a random access preamble, gNB 108 sends a Msg2 or random access response (RAR) (e.g., over a physical downlink shared channel (PDSCH)). The downlink resources for the RAR may be indicated in a first downlink control information (DCI), which gNB 108 may send over a physical downlink control channel (PDCCH). The first DCI may include cyclic redundancy check (CRC) bits which may be scrambled by a random access (RA) radio network temporary identifier (RNTI) (RA-RNTI), where the RA-RNTI is based on the timing of the random access preamble and thus is knowable by both UE 102 and gNB 108. The RAR may include an uplink grant for transmission over a physical uplink shared channel (PUSCH) and a temporary cell RNTI (TC-RNTI) and may also include a timing advance command.

In response to the RAR, UE 102 sends a message (Msg3) that may include a contention resolution identity. For example, the UE 102 may send the Msg3 over the PUSCH and in accordance with the uplink grant. In response to receiving such a Msg3, gNB 108 sends a message (Msg4) (e.g., over the PDSCH). The downlink resources for the RAR may be indicated by a second DCI, which gNB 108 may send over the PDCCH. The second DCI may include CRC bits which may be scrambled by the TC-RNTI that was included in the RAR.

It is possible for multiple UEs to choose the same preamble (in Msg1) and to simultaneously react to a single downlink RA response (Msg2 or RAR) by sending simultaneous RRC Connection Requests (e.g., Msg3's), each including the forty-bit UE-Identity (e.g., a random value or S-Temporary Mobile Subscriber Identity (S-TMSI)) of the corresponding UE. Only one of these requests will be accepted by the network eventually, which will be signaled back by echoing the accepted 40-bit UE-Identity (e.g., in Msg4). If the received contention resolution identity matches with the transmitted identity, the UE declares contention resolution and thereby that the RA procedure was successful.

The four-step RA procedure described above may be vulnerable to a security threat from a pirating attack.

Figure 3:
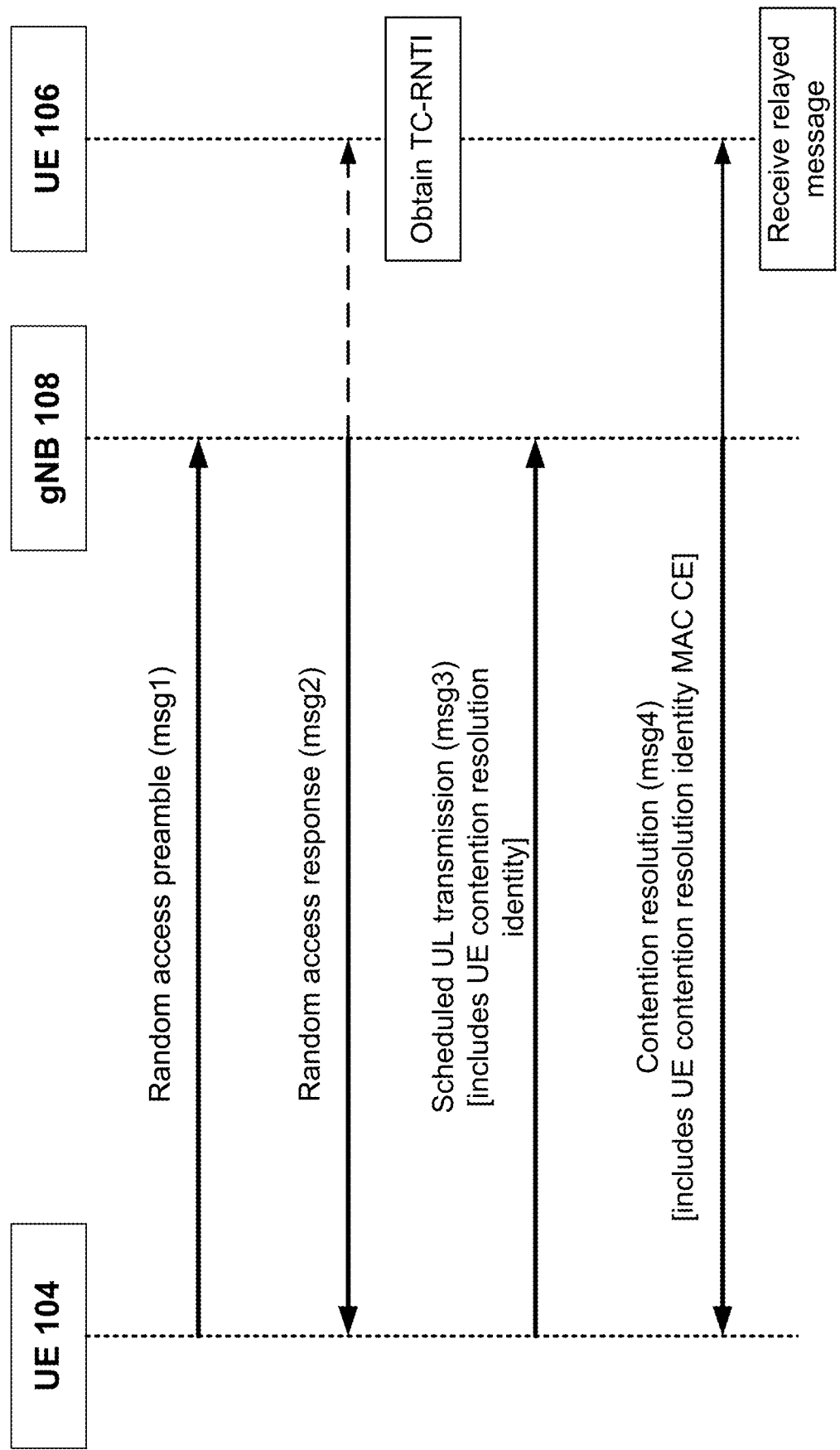
FIG. 3 shows a signaling diagram for an attack in a four-step RA procedure.

FIG. 3 shows a signaling diagram for an example of such an attack in a four-step RA procedure, in which gNB 108 serves unwittingly as a relay for a covert channel between UE 104 and UE 106 without authorization or authentication. A malicious UE 104 sends a forty-bit message (which is not random) to gNB 108 (e.g., as its contention resolution ID), which then rebroadcasts the message (e.g., within Msg4) to all the UEs in the cell coverage. The partner(s) of UE 104 (e.g., UE 106) can passively scan the downlink signals within the coverage area and thereby receive the rebroadcasted message without being traced. Such a "pirate broadcasting attack" may constitute an unlawful communication by utilizing the resources of commercial wireless infrastructure without authorization. The Global System for Mobile Communications (GSM) Association (GSMA) has issued Liaison Statement (LS) R2-2106454 entitled "Stealth Pirating Attack by RACH Rebroadcast Overwriting (SPARROW)" (Fraud and Security Group (FSAG) Doc. 93_009) to 3GPP Technical Specification Group (TSG) Service and System Aspects Working Group (WG) 3 (SA3) and Technical Specification Group Radio Access Network (RAN) WG2 (RAN2) (submitted to 3GPP TSG RAN WG2 #114-e e-Meeting, 19th-27th May, 2021) requesting consideration and possible mitigation of this risk.

Figure 4:
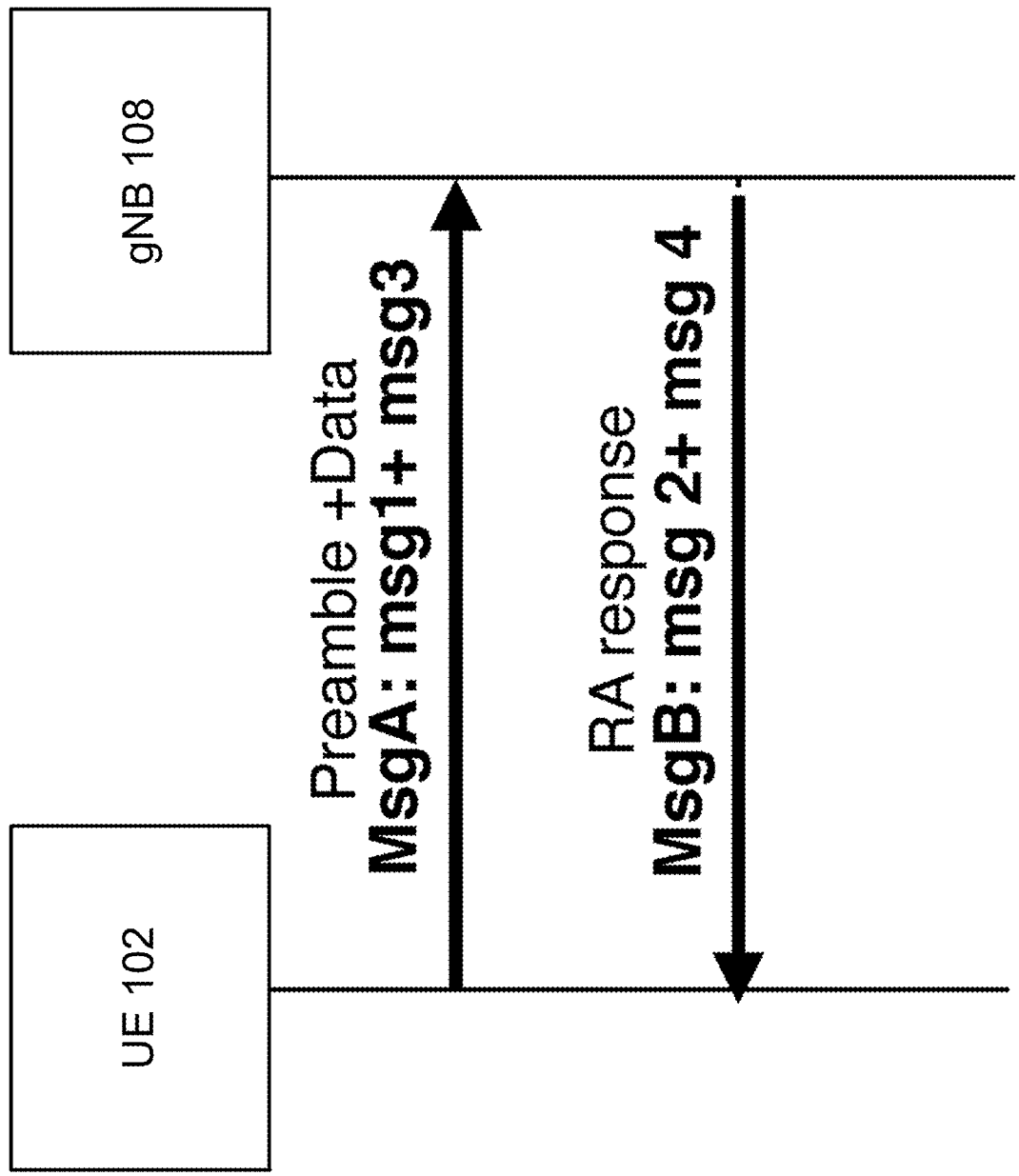
FIG. 4 shows a signaling diagram for a two-step RA procedure.

A 5G network may support a two-step RA procedure (as described in, e.g., section 9.2.6 of 3GPP TS 38.300 v16.5.0 (2021 April)), and FIG. 4 shows a signaling diagram for such a two-step RA procedure between UE 102 and gNB 108. UE 102 transmits a MsgA that includes 1) a random access preamble (Msg1) (e.g., over the PRACH) and 2) a message (Msg3) (e.g., over the PUSCH), where the Msg3 includes a contention resolution identity. For example, the Msg3 may include a common control channel (CCCH) service data unit (SDU) that includes the contention resolution identity.

In response to receiving such a MsgA, gNB 108 sends a MsgB (e.g., over a physical downlink shared channel (PDSCH)). The MsgB may include a random access response (RAR) and the contention resolution identity of MsgA. The RAR in a two-step RA procedure may be somewhat different from the RAR in a four-step procedure as described above (e.g., the RAR in a two-step RA procedure may lack a TC-RNTI). The downlink resources for the MsgB may be indicated by a DCI, which gNB 108 may send over a physical downlink control channel (PDCCH). The DCI may include CRC bits which may be scrambled by a msgB RNTI (msgB-RNTI), where the msgB-RNTI is based on the timing of the random access preamble and thus is knowable by both UE 102 and gNB 108.

Figure 5:
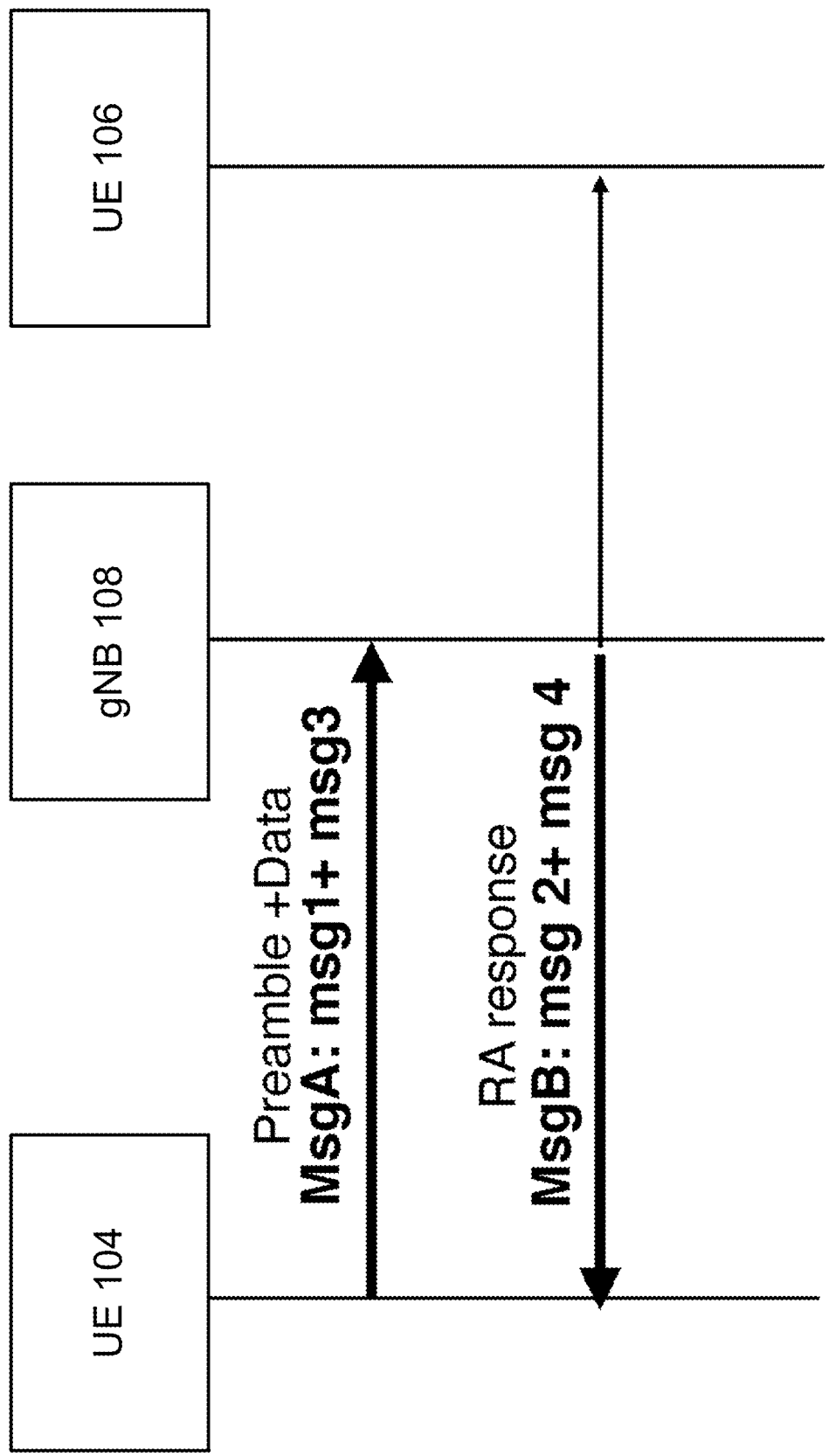
FIG. 5 shows a signaling diagram for an attack in a two-step RA procedure.

The two-step RA procedure may have a security issue similar to that described above, as shown in FIG. 5. In a two-step RA procedure, if a CCCH SDU (msg3) was included in MsgA, the contention resolution may be based on the contention resolution ID included in MsgB. In this case, the contention resolution ID may be the first forty-eight bits of the uplink CCCH SDU. The partner UE 106 may need to know the msgB-RNTI and wait for the window msgB_responseTime, as configured in a system information block 1 (SIB1). The partner UE 106 monitors the PDCCH with msgB-RNTI in order to identify the DCI which allocates the downlink resources for MsgB and to get the contents of MsgB and retrieve the 48-bit content resolution ID, which could be the secret message conveyed by UE 104.

An attack as described above may be effective for a UE 106 located within the Msg4 (or MsgB in 2-step RA) target area. To mitigate such an attack, the gNB 108 may transmit Msg4 with limited transmit power and/or in limited transmit beam directions, based on information and measurements of msg3. For 4G LTE and 5G sub-6 GHz bands, an omnidirectional antenna is assumed for eNB/gNB. Hence, a large coverage area for gNBs may be expected, so that the relaying by a eNB/gNB may reach potentially many malicious UEs 106. For a source malicious UE 104 that is located near the edge of the cell, the transmission of msg4 by gNB 108 may cover the whole cell as the gNB intends to reach the UE 104. For 5G directional beam transmission, the area of retransmission may be significantly reduced. But for non-terrestrial network (NTN) communication, even a narrow beam may cover a huge area of the earth's surface (e.g., a spot having a diameter of 10-100 kilometers).

Certain limits on such a pirate broadcasting attack may be deduced. For example, carrying out such an attack may require modifying the modems of the malicious UEs 104, 106 (e.g., in software and/or firmware). Depending on the implementation of gNB 106, the amount of information conveyed in each such attack may have an upper bound of forty-eight bits (or thirty-nine or forty bits). In a worst case, for example, gNB 108 may be implemented to blindly replay the first forty-eight bits in UL CCCH MAC PDU received in Msg3 (e.g., typically comprising an eight-bit establishment cause+one spare bit+a thirty-nine-bit random string).

Detectability of the attack may increase with use: while single message transmissions (i.e., limited to forty bits) may not be detectable, if the attacking UE 104 tries to use more bandwidth of the covert channel it would be likely to leave a detectable Medium Access Control (MAC) layer traffic pattern. If the attack is launched by a large number of rogue UEs, however, detectability of the traffic pattern may be uncertain. No information as disclosed in the existing RA procedures can be used to identify the attacker, as the attacking UE 104 will not include the true 5G-S-TMSI in Msg3. The attacking UE 104 can also act as a normal device in the subsequent access procedures so there is no real "abnormal behavior" to detect by the network operators.

Due to competition with normal UE access in contention-based random access (CBRA), there may be a risk of UE performance degradation from such attacks. At the least, wasted processing by gNB 108 to process msg1/msg3 from the malicious UE, and to transmit the corresponding msg2 and msg 4, may represent a revenue loss for operators, and in any case such an attack may be an unauthorized usage of a licensed radio resource. An overall risk level may be deemed as low to medium due to poor scalability of the attack.

Techniques that may be implemented to mitigate such an attack are presented. FIG. 6A illustrates an operation flow/algorithmic structure 600 in accordance with some embodiments. The operation flow/algorithmic structure 600 may be performed or implemented by a base station such as, for example, base station 108 or 2200; or components thereof, for example, baseband processor 1704A.

The operation flow/algorithmic structure 600 may include, at 604, receiving a first message that includes a contention resolution identity. For example, the first message may be a msg3 or msgA as described herein.

The operation flow/algorithmic structure 600 may include, at 608, generating a code value that is based on the contention resolution identity.

The operation flow/algorithmic structure 600 may include, at 612, sending a second message that includes the code value. For example, the second message may be a msg4 or msgB as described herein.

Figure 6B:
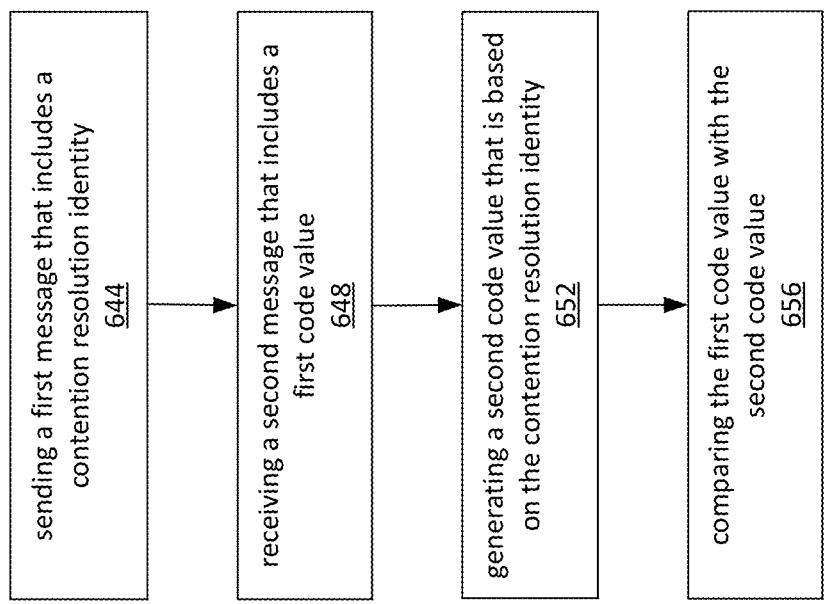
FIG. 6B illustrates an operational flow/algorithmic structure in accordance with some embodiments.
Figure 6A:
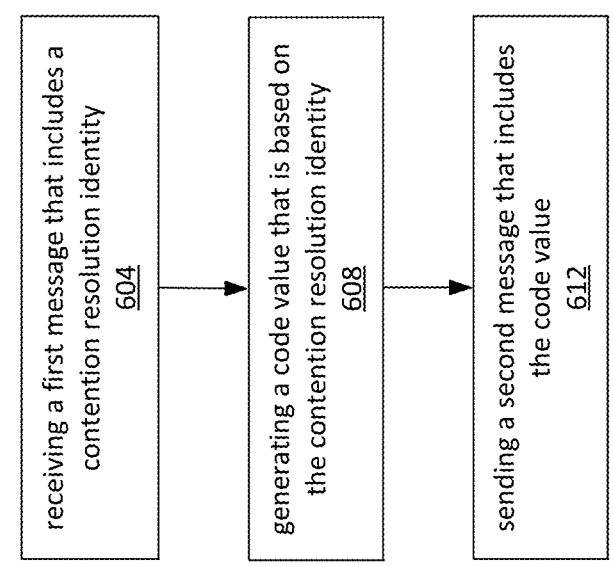
FIG. 6A illustrates an operational flow/algorithmic structure in accordance with some embodiments.

FIG. 6B illustrates an operation flow/algorithmic structure 640 in accordance with some embodiments. The operation flow/algorithmic structure 640 may be performed or implemented by a UE such as, for example, UE 102 or UE 1600; or components thereof, for example, baseband processor 1604A.

The operation flow/algorithmic structure 640 may include, at 644, sending a first message that includes a contention resolution identity. For example, the first message may be a msg3 or msgA as described herein.

The operation flow/algorithmic structure 640 may include, at 648, receiving a second message that includes a first code value. For example, the second message may be a msg4 or msgB as described herein.

The operation flow/algorithmic structure 640 may include, at 652, generating a second code value that is based on the contention resolution identity.

The operation flow/algorithmic structure 640 may include, at 656, comparing the first code value with the second code value.

Figure 7A:
FIG. 7A shows a one-way hash in accordance with some embodiments.

In one example, generating the code value at 608 (and, correspondingly, generating the second code value at 652) is performed using a hash function. Instead of simply replaying the forty-bit 'random' number sent by malicious UE 104, the gNB 108 conducts a one-way hash of the Msg3's input (X) (e.g., as shown in FIG. 7A) and includes the hash output h(X) in Msg4. In one example (without limitation), the hash function is an implementation of Secure Hash Algorithm 2 (SHA-2), such as, for example, SHA-256. The partner UE 106 can no longer receive the 40-bit secret message transmitted by malicious UE 104 because it cannot reverse the one-way hash, while UE 102 generates the hash output easily because it knows the contention resolution identity that it sent. Mathematically, it is possible for a hash collision to occur, but the probability is extremely low due to the limited number of UEs which might send the same random access preamble in Msg1.

Even for a case in which malicious UEs 104 and 106 attempt to pre-compute the relationship between X and h(X), the number of bits which can be secretly conveyed may be significantly reduced. If UE 104 prepares M different "X→h(X)" in the dictionary, for example, then the information entropy is reduced to log 2(M) in each attack, which may significantly reduce the efficiency of the attack.

Figure 7B:
FIG. 7B shows a one-way hash in which a nonce value is added in accordance with some embodiments.

An approach that includes using a hash function to generate the code value at 608 (and to generate the second code value at 652) may be enhanced by allowing the gNB 108 to add an extra input into the one-way hash function. As shown in FIG. 7B, for example, a random nonce value (e.g., a 16-bit or 32-bit random value) may be added as an input to the hash function: Hash (X, Nonce)=h(X). In this approach, the gNB 108 includes the nonce value in Msg4, so that a non-malicious UE 102 can still match the h(X) with X (e.g., the contention resolution identity) by adding the nonce value as an input to the hash function.

Figure 7C:
FIG. 7C shows a one-way hash in which a radio network temporary identifier is added in accordance with some embodiments.

Such an enhancement adds to the computation cost for an malicious UE 106 to participate in this attack. Malicious UEs 104 and 106 can no longer prepare a X→h(X) dictionary and conduct a simple look-up. Rather, UE 106 must compute the hash for all M hypotheses with the nonce value on-the-fly. In order to implement such an enhancement, a new information element for the nonce value may be included in Msg4. To avoid the need for such a modification, the random access (RA) radio network temporary identifier (RNTI) (RA-RNTI) may be used as the additional input to the hash function instead of the nonce value (e.g., as shown in FIG. 7C). Because the RA-RNTI is based on a timing of the random access preamble (e.g., a PRACH occasion in which the preamble was transmitted), it is already known by both gNB 108 and UE 102 before Msg3 is transmitted. This approach may not be as effective as using the nonce value, however, as the RA-RNTI can be known in advance by UE 106 as a result of coordination between malicious UEs 104 and 106 (e.g., transmission of the preamble by UE 104 during a PRACH occasion that is known to UE 106).

A second approach includes transforming the content of Msg4 by scrambling it with an RNTI. In one such example, the network (e.g., gNB 108) scrambles the Msg3 content in Msg4 (e.g., the contention resolution identity) using RA-RNTI. Note that RA-RNTI is already used by network to scramble PDCCH in Msg2 (e.g., to scramble the CRC bits of the DCI that indicates the downlink resource allocation for Msg2). For malicious UEs 104 and 106 to launch the attack, UE 106 needs to know the timing of the Msg1 transmission (i.e., the preamble) which is used to determine RA-RNTI. A non-malicious UE 102 will know exactly when it transmitted the preamble in time and will not be impacted by this approach, as it can easily use the same RA-RNTI to descramble the Msg3 content in Msg4 (e.g., the contention resolution identity).

As for the hash function modification to include RA-RNTI as described above, malicious UEs 104 and 106 may pre-negotiate to work around this approach: in this case, by synchronizing their timing in the attack such that the RA-RNTI may be known to UE 106. Also, RA-RNTI values are limited within a short time duration, depending on PRACH configuration, so that malicious UE 106 may execute a brute-force descrambling attack on Msg4 by trying a limited list of RA-RNTI candidates.

In another example of this second approach, the gNB 108 scrambles the Msg3 content (e.g., the contention resolution identity) in Msg4 using the temporary cell RNTI (TC-RNTI) which is included in Msg2 (e.g., the RAR of a four-step RA procedure). In this case, while the TC-RNTI is knowable by the malicious UE 106 upon reception of Msg2, its value cannot be determined in advance like the RA-RNTI can. Again, a non-malicious UE 102 can easily use the same TC-RNTI as included in Msg2 to descramble the Msg3 content in Msg4 (e.g., the contention resolution identity).

Figure 8B:
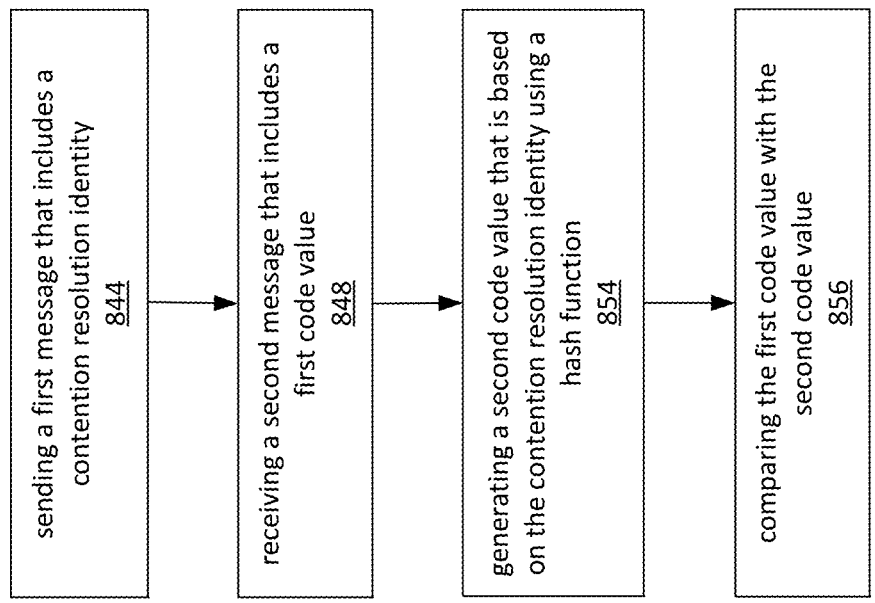
FIG. 8B illustrates an operational flow/algorithmic structure in accordance with some embodiments.
Figure 8A:
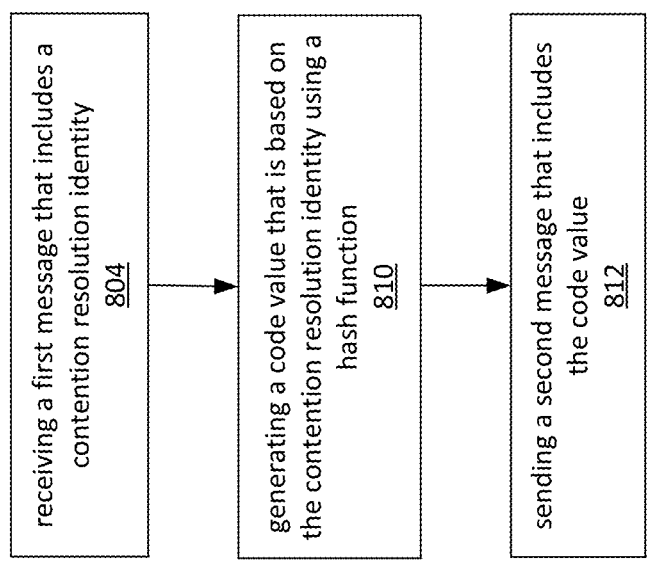
FIG. 8A illustrates an operational flow/algorithmic structure in accordance with some embodiments.

FIG. 8A illustrates an implementation 800 of operation flow/algorithmic structure 600 in accordance with some embodiments. The operation flow/algorithmic structure 800 may be performed or implemented by a base station such as, for example, base station 108 or 1700; or components thereof, for example, baseband processor 1704A.

The operation flow/algorithmic structure 800 may include instances 804 and 812 of 604 and 612, respectively, as described herein. The operation flow/algorithmic structure 800 may also include, at an implementation 810 of 608, generating a code value that is based on the contention resolution identity using a hash function. In a further example, the second message may include a nonce value, and generating the code value may be based on the contention resolution identity and a nonce value. Alternatively, generating the code value may be based on the contention resolution identity and an RA-RNTI that is based on at least a timing of a random access preamble.

FIG. 8B illustrates an implementation 840 of operation flow/algorithmic structure 640 in accordance with some embodiments. The operation flow/algorithmic structure 840 may be performed or implemented by a UE such as, for example, UE 102 or UE 1600; or components thereof, for example, baseband processor 1604A.

The operation flow/algorithmic structure 840 may include instances 844, 848, and 856 of 644, 648, and 656, respectively, as described herein. The operation flow/algorithmic structure 840 may also include, at an implementation 854 of 652, generating a second code value that is based on the contention resolution identity using a hash function. In a further example, the second message may include a nonce value, and generating the second code value may be based on the contention resolution identity and a nonce value. Alternatively, generating the second code value may be based on the contention resolution identity and an RA-RNTI that is based on at least a timing of a random access preamble.

Figure 9B:
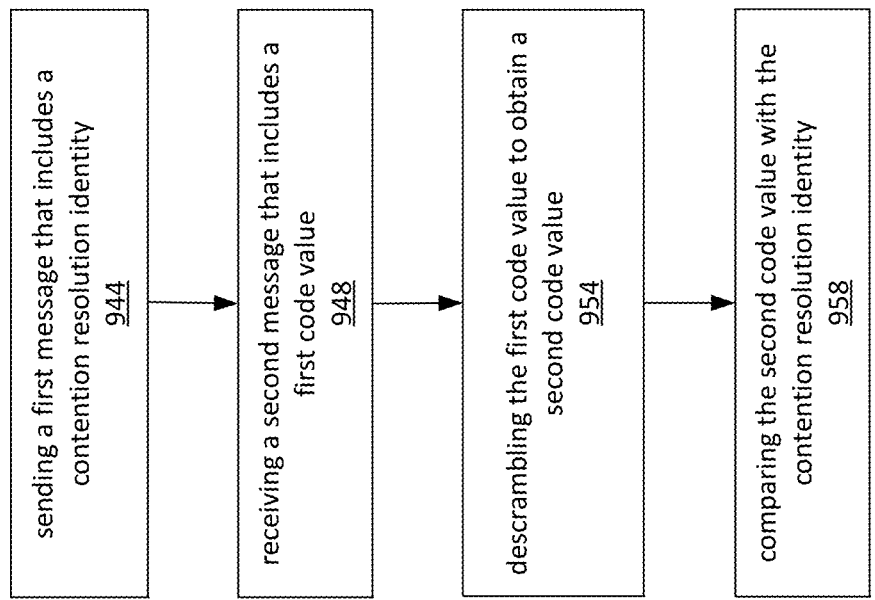
FIG. 9B illustrates an operational flow/algorithmic structure in accordance with some embodiments.
Figure 9A:
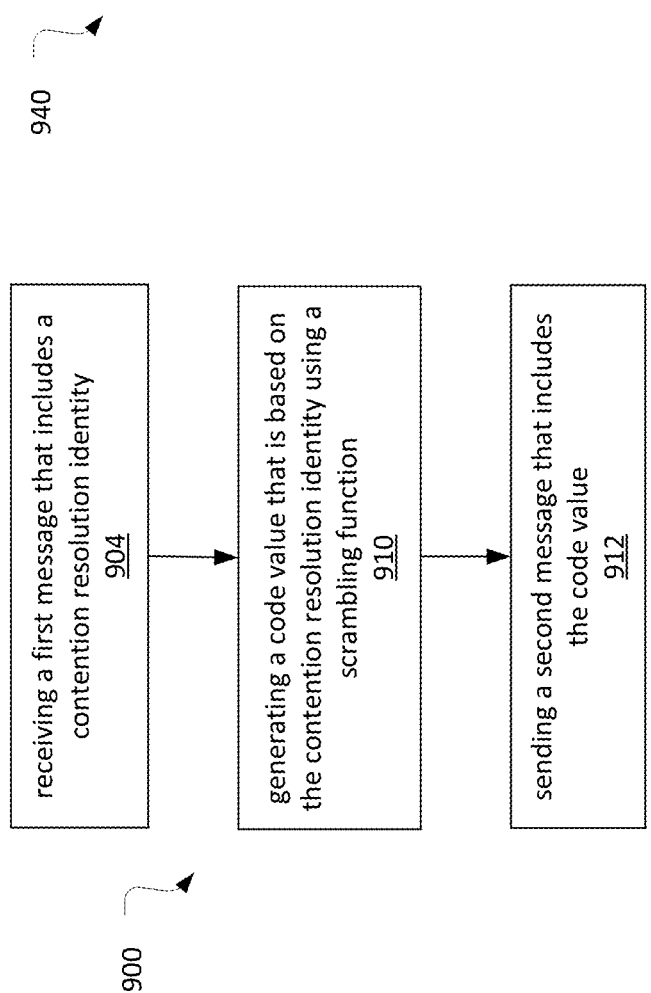
FIG. 9A illustrates an operational flow/algorithmic structure in accordance with some embodiments.

FIG. 9A illustrates an implementation 900 of operation flow/algorithmic structure 600 in accordance with some embodiments. The operation flow/algorithmic structure 900 may be performed or implemented by a base station such as, for example, base station 108 or 1700; or components thereof, for example, baseband processor 1704A.

The operation flow/algorithmic structure 900 may include instances 904 and 912 of 604 and 612, respectively, as described herein. The operation flow/algorithmic structure 900 may also include, at an implementation 910 of 608, generating a code value that is based on the contention resolution identity using a scrambling function. For example, generating the code value may be based on the contention resolution identity and an RA-RNTI that is based on at least a timing of a random access preamble (e.g., generating the code value by using the RA-RNTI to scramble the contention resolution identity). Alternatively, generating the code value may be based on the contention resolution identity and a TC-RNTI (e.g., generating the code value by using the TC-RNTI to scramble the contention resolution identity).

FIG. 9B illustrates an operation flow/algorithmic structure 940 in accordance with some embodiments. The operation flow/algorithmic structure 940 may be performed or implemented by a UE such as, for example, UE 104 or UE 1600; or components thereof, for example, baseband processor 1604A.

The operation flow/algorithmic structure 940 may include instances 944 and 948 of 644 and 648, respectively, as described herein. The operation flow/algorithmic structure 940 may also include, at 954, descrambling the first code value to obtain a second code value. For example, descrambling the first code value may be based on an RA-RNTI that is based on at least a timing of a random access preamble. Alternatively, descrambling the first code value may be based on a TC-RNTI (which may be received, for example, in a random access response).

As shown in FIG. 9B, the operation flow/algorithmic structure 940 may further include, at 958, comparing the second code value with the contention resolution identity.

In a third approach, an asymmetric key technique is used to protect Msg3 and Msg4 in a four-step RA procedure. Introduction of a signature is under consideration for CCCH protection, mainly to try to authenticate the message from the base station to the UE for fake base station detection. For a pirate UE attack as described herein, however, a solution to ensure that a UE's message to the gNB can be authenticated by the gNB is desired.

Figure 10:
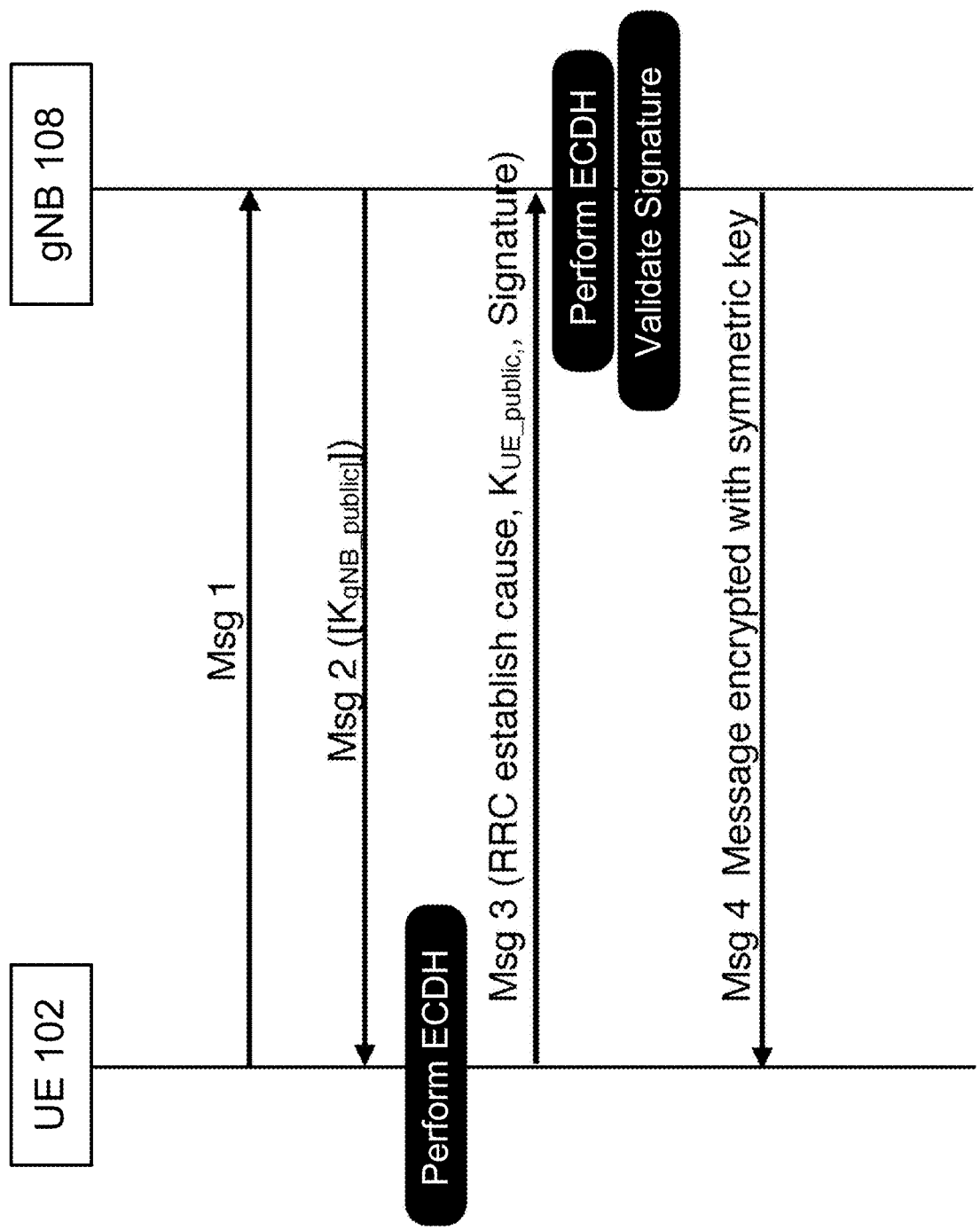
FIG. 10 shows a signaling diagram for an asymmetric key technique in accordance with some embodiments.

This technique assumes that the UE 102 has its own <public, private> key pair (KUE_private, KUE_public) and that the gNB 108 also has its own <public, private> key pair (KgNB_private, KgNB_public). FIG. 10 shows a signaling diagram for this solution in a four-step RA procedure as follows: 1) The public key of gNB 108 may be broadcasted (e.g., in system information block (SIB), or it may be included in Msg2. 2) After obtaining the key KgNB_public, UE 102 performs an ECDH (elliptic-curve Diffie-Hellman) algorithm to generate a shared session key Ksess, which is based on keys KUE_public and KgNB_public. 3) UE 102 creates a signature with Ksess and includes both the signature and key KUE_public in Msg3. 4) gNB 108 obtains key KUE_public from Msg3, performs ECDH to generate the shared session key Ksess, then uses key Ksess to verify the signature. If the signature is verified, then gNB 108 sends msg4 protected with Ksess.

It is worth noting that with a technique as described in FIG. 10, the gNB 108 does not need to repeat what is presented in Msg3 in Msg4, thereby preventing the pirate attack. The normal UE 102 will be able to decipher Msg4 using Ksess. For another UE which sends the same RA preamble in Msg1 and also sends a Msg3 containing its public key, the Msg4 from gNB 108 would not be deciphered by this other UE, as its KUE_public was not chosen by the gNB to generate the session key.

A technique as described in FIG. 10 may avoid the re-broadcast of a UE identity by gNB 108 in Msg4. Public key overhead may be relatively large (for example, 512-bit or 1024-bit, although shorter key lengths are also possible).

Figure 11:
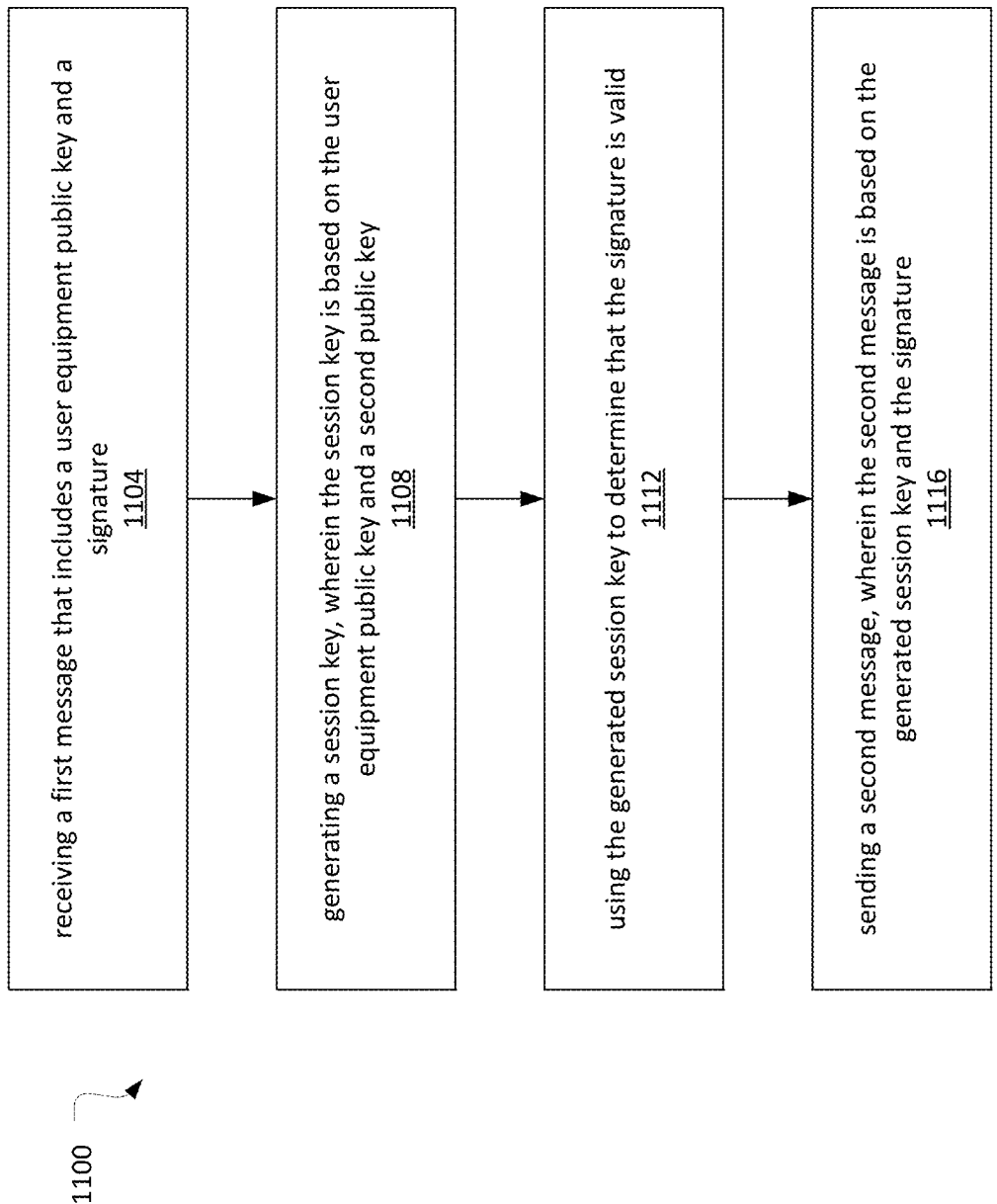
FIG. 11 illustrates an operational flow/algorithmic structure in accordance with some embodiments.

FIG. 11 illustrates an operation flow/algorithmic structure 1100 in accordance with some embodiments. The operation flow/algorithmic structure 1100 may be performed or implemented by a base station such as, for example, base station 108 or 1700; or components thereof, for example, baseband processor 1704A.

The operation flow/algorithmic structure 1100 may include, at 1104, receiving a first message that includes a user equipment public key and a signature. For example, the first message may be a msg3 as described herein.

The operation flow/algorithmic structure 1100 may include, at 1108, generating a session key, wherein the session key is based on the user equipment public key and a second public key (e.g., a public key of a base station).

The operation flow/algorithmic structure 1100 may include, at 1112, using the generated session key to determine that the signature is valid.

The operation flow/algorithmic structure 1100 may include, at 1116, sending a second message, wherein the second message is based on the generated session key and the signature. For example, the second message may be a msg4 as described herein.

Figure 12:
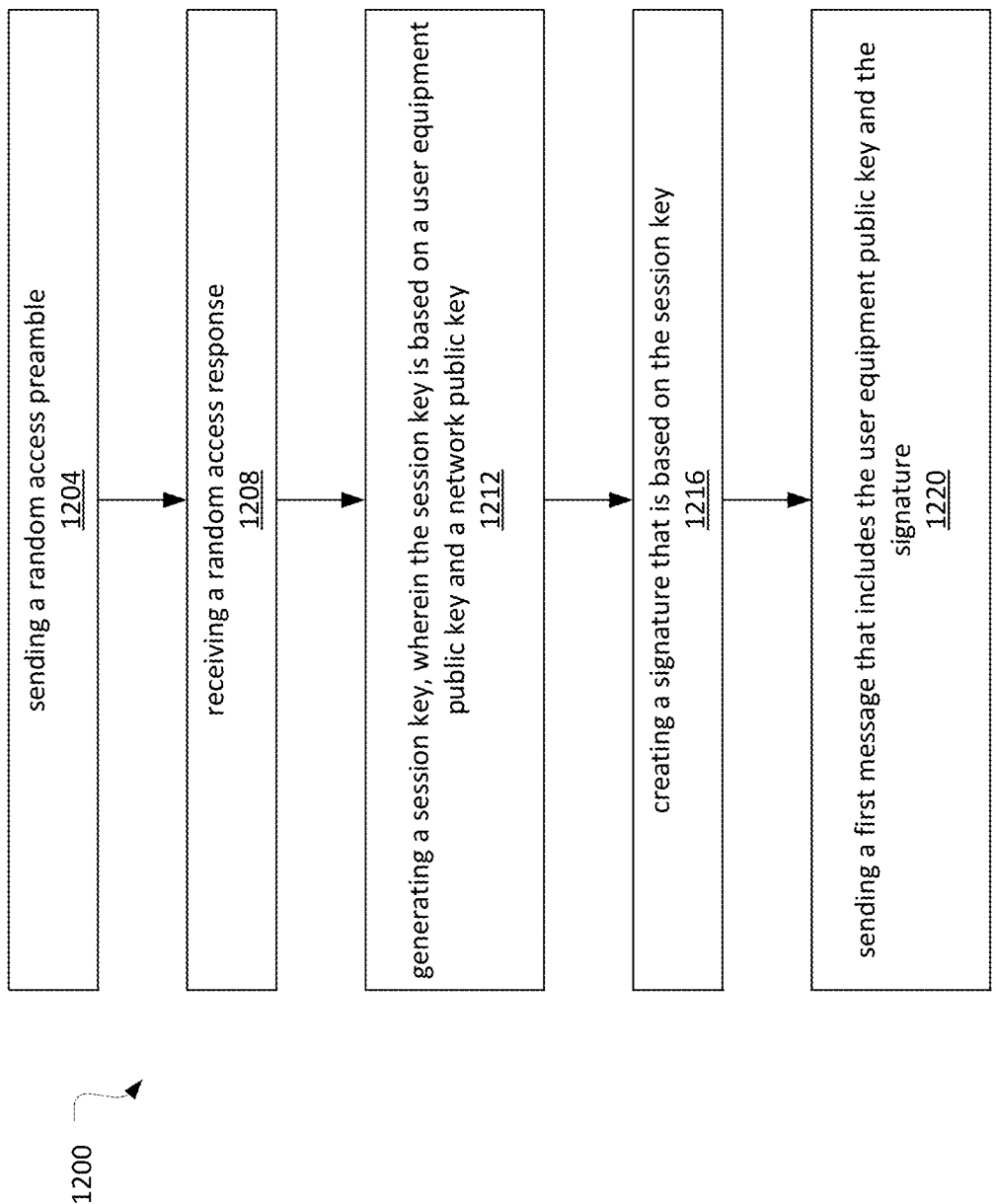
FIG. 12 illustrates an operational flow/algorithmic structure in accordance with some embodiments.

FIG. 12 illustrates an operation flow/algorithmic structure 1200 in accordance with some embodiments. The operation flow/algorithmic structure 1200 may be performed or implemented by a UE such as, for example, UE 102 or UE 1600; or components thereof, for example, baseband processor 1604A.

The operation flow/algorithmic structure 1200 may include, at 1204, sending a random access preamble. For example, sending the random access preamble may be performed over a PRACH.

The operation flow/algorithmic structure 1200 may include, at 1208, receiving a random access response (RAR). For example, the random access response may be received over a PDSCH.

The operation flow/algorithmic structure 1200 may include, at 1212, generating a session key, wherein the session key is based on a user equipment public key and a network public key (e.g., a public key of a base station). The network public key may be received, for example, in the RAR, or in an SIB. The session key may be created, for example, by executing an ECDH algorithm.

The operation flow/algorithmic structure 1200 may include, at 1216, creating a signature that is based on the generated session key. The signature may also be based, for example, on a contention resolution identity.

The operation flow/algorithmic structure 1200 may include, at 1220, sending a first message that includes the user equipment public key and the generated signature. For example, the first message may be a msg3 as described herein.

Techniques are described above that include sending an encoded (e.g., hashed or scrambled) value in Msg4 (in a four-step RA procedure) or in MsgB (in a two-step RA procedure). Public-key based techniques are also described, which may be computationally intensive and may add overhead for all UEs conducting RA procedures.

A further technique is described that may put some additional requirements in Msg3 (in a four-step RA procedure) or MsgA (in a two-step RA procedure), so that 1) an attack from a malicious UE 104 can be detected in real-time, and re-broadcasting of Msg4 (or MsgB) may be prevented; or 2) an attack from malicious UE 104 is not detected in real-time, but some signature is provided by UE 104 which can be recorded, for example, to support future examination to detect if an attack ever happened. The network can later examine the UE ID in ensuring that a Non-Access Stratum (NAS) procedure matches the claimed UE identity involved in the Msg3 (MsgA) signature.

FIG. 13 shows a signaling diagram for such an approach in a four-step RA procedure. Before the RA procedure begins, UE 102 and the network share a "long term identity" e.g., a "long term key") that identifies UE 102. UE 102 uses the long term identity and an RNTI (e.g., RA_RNTI or TC-RNTI) to generate a hash signature (e.g., using a hash function as described above), and the hash signature is sent (e.g., as a contention resolution identity) in Msg3 (or in MsgA in a two-step RA procedure). The hash signature may have a length of, for example, forty bits. At the network side, gNB 108 and/or core network (CN) functions (e.g., access and mobility management function (AMF)) may verify the signature and determine whether this Msg3 (MsgA) is valid or not, if the processing delay for such verification is feasible. If the Msg3 (MsgA) is determined to be invalid, then gNB 108 may choose to ignore the Msg3 (MsgA) and may record it for future examination. If such processing delay is infeasible, gNB 108 may transmit Msg4 (or MsgB in a two-step RA procedure) anyway, but record the signature for future verification. In the latter case, the attack may not be prevented, as a malicious UE 104 may ignore the rule or impersonate someone else, but the record can at least render the attack detectable. For example, failure of a UE to present a valid signature (in Msg3) with a valid long term identity or long term key can be recorded, and detection of such failure may also trigger other action (e.g., referral to law enforcement).

In another example of this approach, the signature may be a separate information element (e.g., in addition to the 40-bit RNTI or 40-bit random number (e.g., contention resolution identity)) in Msg3 (MsgA). In this case, the signature is not re-broadcasted in Msg4 (MsgB).

Figure 14B:
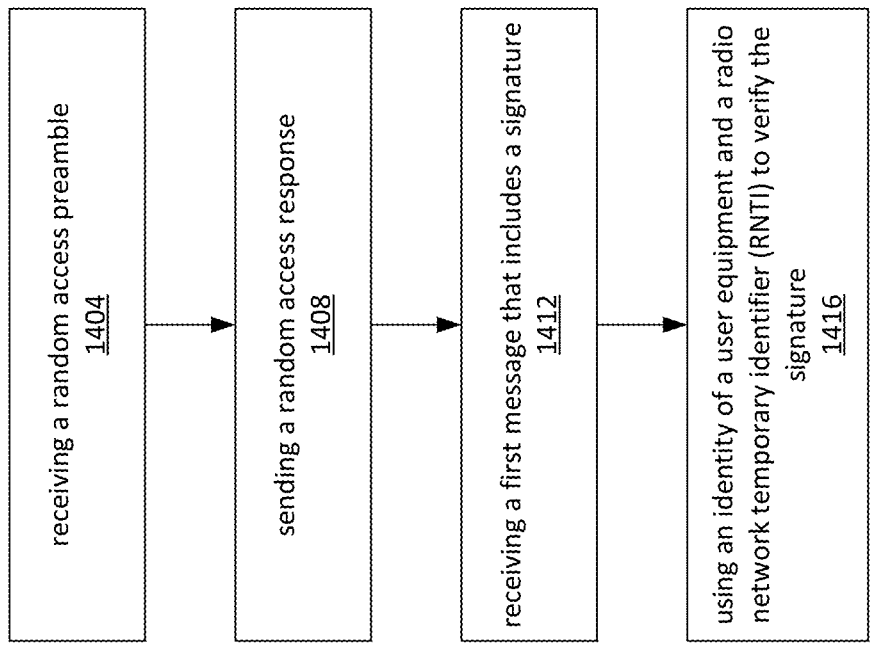
FIG. 14B illustrates an operational flow/algorithmic structure in accordance with some embodiments.
Figure 14A:
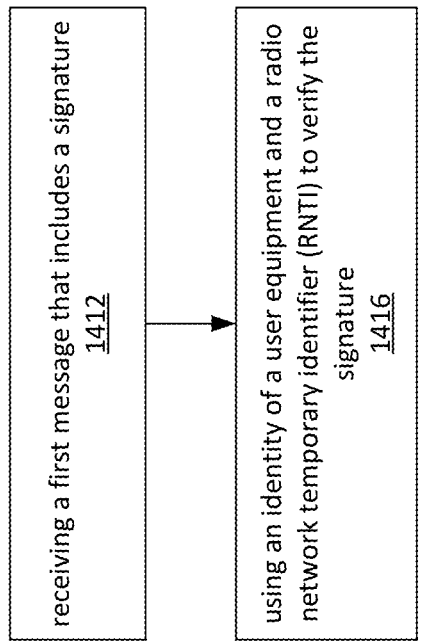
FIG. 14A illustrates an operational flow/algorithmic structure in accordance with some embodiments.

FIG. 14A illustrates an operation flow/algorithmic structure 1400 in accordance with some embodiments. The operation flow/algorithmic structure 1400 may be performed or implemented by a base station such as, for example, base station 108 or 1700; or components thereof, for example, baseband processor 1704A.

The operation flow/algorithmic structure 1400 may include, at 1412, receiving a first message that includes a signature. For example, the first message may be a msg3 (e.g., in a four-step RA procedure) or a msgA (e.g., in a two-step RA procedure) as described herein.

The operation flow/algorithmic structure 1400 may include, at 1416, using an identity of a UE and a radio network temporary identifier (RNTI) to verify the signature. Such verification may include, for example, generating a code value that is based on the identity of the UE and the RNTI (e.g., using a hash function) and comparing the code value to the received signature. The RNTI may be, for example, a RA-RNTI (e.g., based on a timing of the random access preamble). In a four-step RA procedure, the RNTI may be a TC-RNTI (which may be included in the RAR).

FIG. 14B illustrates an implementation 1440 of operation flow/algorithmic structure 1400 in accordance with some embodiments. The operation flow/algorithmic structure 1440 may be performed or implemented by a base station such as, for example, base station 108 or 1700; or components thereof, for example, baseband processor 1704A.

The operation flow/algorithmic structure 1440 may further include, at 1404, receiving a random access preamble. For example, the random access preamble may be received over a PRACH.

The operation flow/algorithmic structure 1440 may further include, at 1408, sending a random access response (RAR). For example, sending the random access response may be performed over a PDSCH.

FIG. 15A illustrates an operation flow/algorithmic structure 1500 in accordance with some embodiments. The operation flow/algorithmic structure 1500 may be performed or implemented by a UE such as, for example, UE 102 or UE 1600; or components thereof, for example, baseband processor 1604A.

The operation flow/algorithmic structure 1500 may include, at 1512, generating a signature, wherein the signature is based on an identity of the user equipment and a RNTI. Generating the signature may be performed, for example, using a hash function. The RNTI may be, for example, a RA-RNTI (e.g., based on a timing of the random access preamble). In a four-step RA procedure, the RNTI may be a TC-RNTI (which may be included in the RAR).

The operation flow/algorithmic structure 1500 may include, at 1516, sending a first message that includes the generated signature. For example, the first message may be a msg3 (e.g., in a four-step RA procedure) or a msgA (e.g., in a two-step RA procedure) as described herein.

FIG. 15B illustrates an operation flow/algorithmic structure 1500 in accordance with some embodiments. The operation flow/algorithmic structure 1500 may be performed or implemented by a UE such as, for example, UE 102 or UE 1600; or components thereof, for example, baseband processor 1604A.

The operation flow/algorithmic structure 1500 may include, at 1504, sending a random access preamble. For example, sending the random access preamble may be performed over a PRACH.

The operation flow/algorithmic structure 1500 may include, at 1508, receiving a random access response (RAR). For example, the random access response may be received over a PDSCH.

Figure 16:
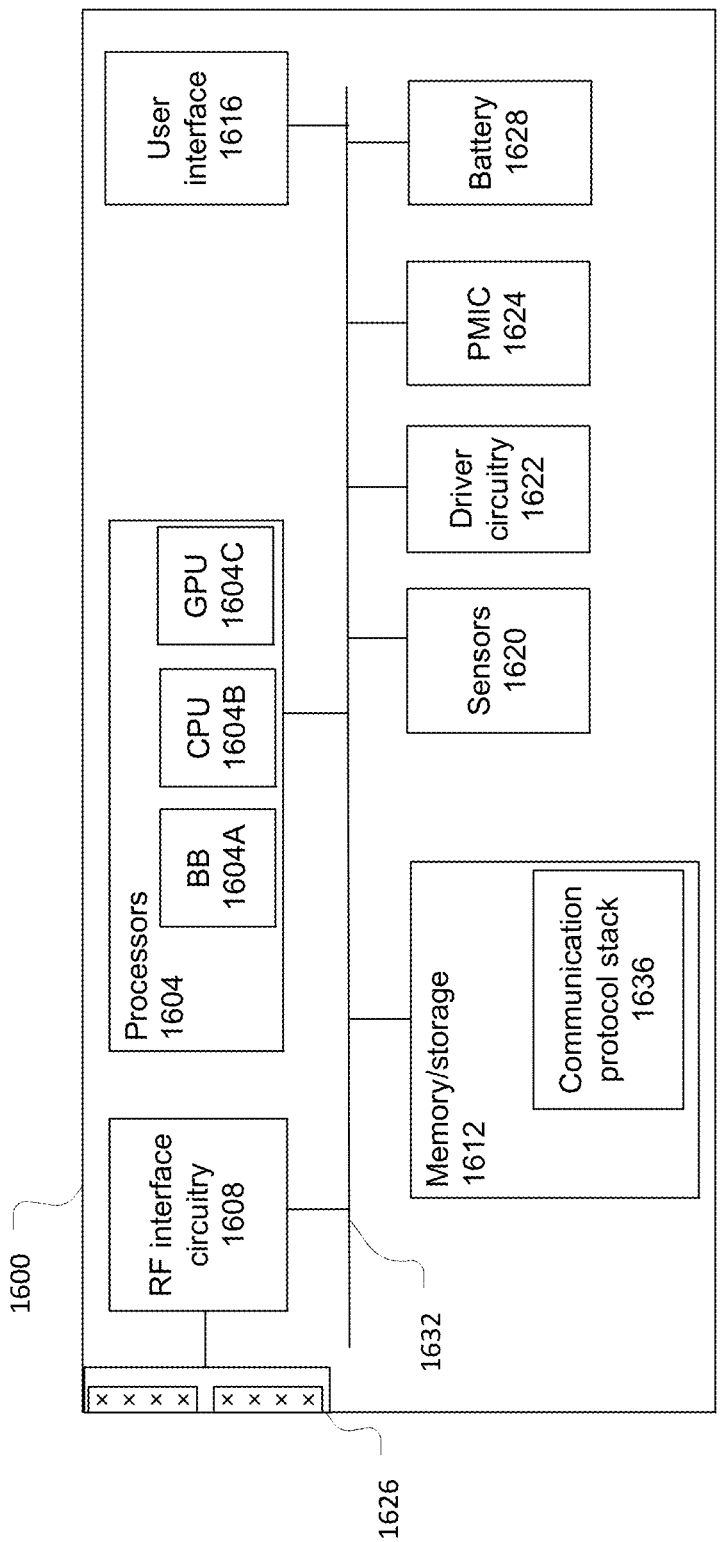
FIG. 16 illustrates a user equipment in accordance with some embodiments.

FIG. 16 illustrates a UE 1600 in accordance with some embodiments. The UE 1600 may be similar to and substantially interchangeable with UE 102 of FIG. 1.

The UE 1600 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices.

The UE 1600 may include processors 1604, RF interface circuitry 1608, memory/storage 1612, user interface 1616, sensors 1620, driver circuitry 1622, power management integrated circuit (PMIC) 1624, antenna structure 1626, and battery 1628. The components of the UE 1600 may be implemented as integrated circuits (ICs), portions thereof, discrete electronic devices, or other modules, logic, hardware, software, firmware, or a combination thereof. The block diagram of FIG. 16 is intended to show a high-level view of some of the components of the UE 1600. However, some of the components shown may be omitted, additional components may be present, and different arrangement of the components shown may occur in other implementations.

The components of the UE 1600 may be coupled with various other components over one or more interconnects 1632, which may represent any type of interface, input/output, bus (local, system, or expansion), transmission line, trace, optical connection, etc. that allows various circuit components (on common or different chips or chipsets) to interact with one another.

The processors 1604 may include processor circuitry such as, for example, baseband processor circuitry (BB) 1604A, central processor unit circuitry (CPU) 1604B, and graphics processor unit circuitry (GPU) 1604C. The processors 1604 may include any type of circuitry or processor circuitry that executes or otherwise operates computer-executable instructions, such as program code, software modules, or functional processes from memory/storage 1612 to cause the UE 1600 to perform operations as described herein.

In some embodiments, the baseband processor circuitry 1604A may access a communication protocol stack 1636 in the memory/storage 1612 to communicate over a 3GPP compatible network. In general, the baseband processor circuitry 1604A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1608.

The baseband processor circuitry 1604A may generate or process baseband signals or waveforms that carry information in 3GPP-compatible networks. In some embodiments, the waveforms for NR may be based cyclic prefix OFDM "CP-OFDM" in the uplink or downlink, and discrete Fourier transform spread OFDM "DFT-S-OFDM" in the uplink.

The memory/storage 1612 may include one or more non-transitory, computer-readable media that includes instructions (for example, communication protocol stack 1636) that may be executed by one or more of the processors 1604 to cause the UE 1600 to perform various operations described herein. The memory/storage 1612 include any type of volatile or non-volatile memory that may be distributed throughout the UE 1600. In some embodiments, some of the memory/storage 1612 may be located on the processors 1604 themselves (for example, L1 and L2 cache), while other memory/storage 1612 is external to the processors 1604 but accessible thereto via a memory interface. The memory/storage 1612 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1608 may include transceiver circuitry and radio frequency front module (RFEM) that allows the UE 1600 to communicate with other devices over a radio access network. The RF interface circuitry 1608 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1626 and proceed to filter and amplify (with a low-noise amplifier) the signal. The signal may be provided to a receiver of the transceiver that down-converts the RF signal into a baseband signal that is provided to the baseband processor of the processors 1604.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1626.

In various embodiments, the RF interface circuitry 1608 may be configured to transmit/receive signals in a manner compatible with NR access technologies.

The antenna 1626 may include antenna elements to convert electrical signals into radio waves to travel through the air and to convert received radio waves into electrical signals. The antenna elements may be arranged into one or more antenna panels. The antenna 1626 may have antenna panels that are omnidirectional, directional, or a combination thereof to enable beamforming and multiple input, multiple output communications. The antenna 1626 may include microstrip antennas, printed antennas fabricated on the surface of one or more printed circuit boards, patch antennas, phased array antennas, etc. The antenna 1626 may have one or more panels designed for specific frequency bands including bands in FR1 or FR2.

The user interface circuitry 1616 includes various input/output (I/O) devices designed to enable user interaction with the UE 1600. The user interface 1616 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 1600.

The sensors 1620 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1622 may include software and hardware elements that operate to control particular devices that are embedded in the UE 1600, attached to the UE 1600, or otherwise communicatively coupled with the UE 1600. The driver circuitry 1622 may include individual drivers allowing other components to interact with or control various input/output (I/O) devices that may be present within, or connected to, the UE 1600. For example, driver circuitry 1622 may include a display driver to control and allow access to a display device, a touchscreen driver to control and allow access to a touchscreen interface, sensor drivers to obtain sensor readings of sensor circuitry 1620 and control and allow access to sensor circuitry 1620, drivers to obtain actuator positions of electro-mechanic components or control and allow access to the electro-mechanic components, a camera driver to control and allow access to an embedded image capture device, audio drivers to control and allow access to one or more audio devices.

The PMIC 1624 may manage power provided to various components of the UE 1600. In particular, with respect to the processors 1604, the PMIC 1624 may control power-source selection, voltage scaling, battery charging, or DC-to-DC conversion.

In some embodiments, the PMIC 1624 may control, or otherwise be part of, various power saving mechanisms of the UE 1600 including DRX as discussed herein.

A battery 1628 may power the UE 1600, although in some examples the UE 1600 may be mounted deployed in a fixed location, and may have a power supply coupled to an electrical grid. The battery 1628 may be a lithium ion battery, a metal-air battery, such as a zinc-air battery, an aluminum-air battery, a lithium-air battery, and the like. In some implementations, such as in vehicle-based applications, the battery 1628 may be a typical lead-acid automotive battery.

Figure 17:
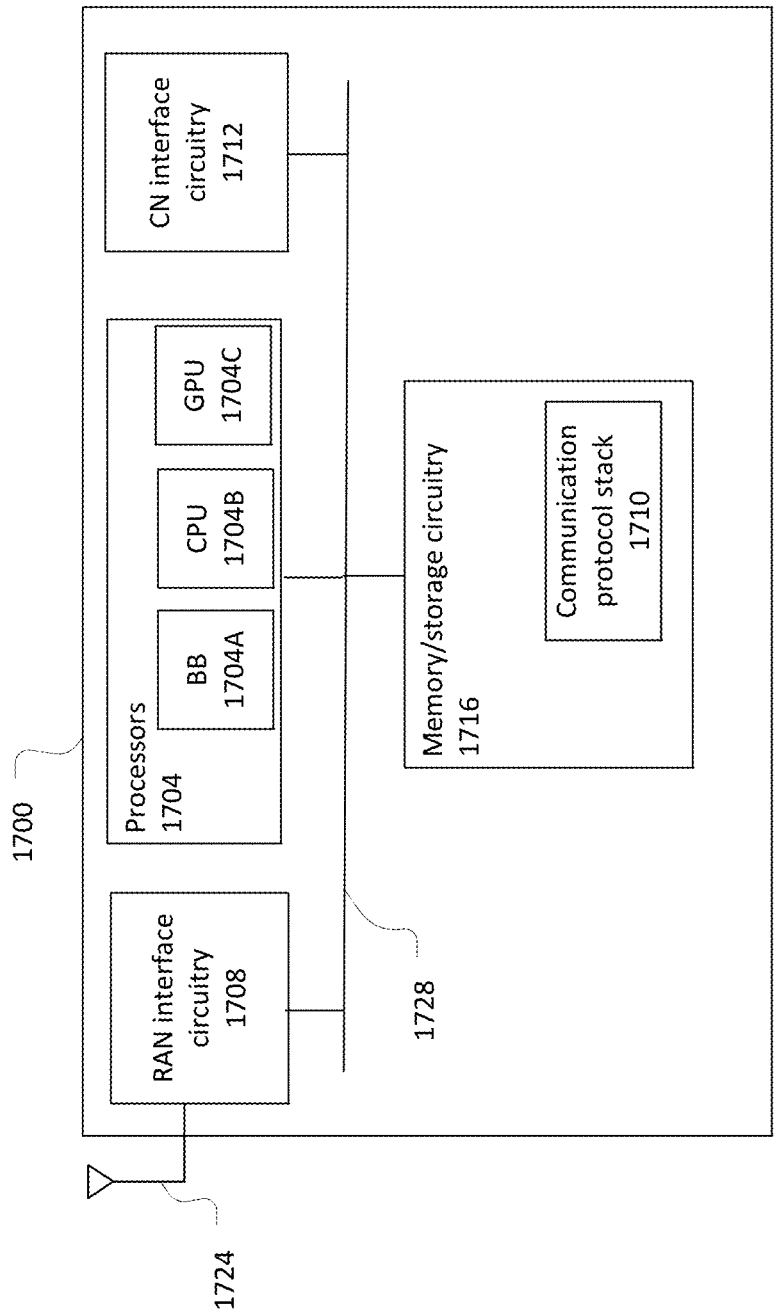
FIG. 17 illustrates a base station in accordance with some embodiments.

FIG. 17 illustrates an access node 1700 (e.g., a gNB) in accordance with some embodiments. The access node 1700 may be similar to and substantially interchangeable with access node 108.

The access node 1700 may include processors 1704, RF interface circuitry 1708, core network (CN) interface circuitry 1712, memory/storage circuitry 1716, and antenna structure 1726.

The components of the access node 1700 may be coupled with various other components over one or more interconnects 1728.

The processors 1704, RF interface circuitry 1708, memory/storage circuitry 1716 (including communication protocol stack 1710), antenna structure 1726, and interconnects 1728 may be similar to like-named elements shown and described with respect to FIG. 16.

The CN interface circuitry 1712 may provide connectivity to a core network, for example, a $5^{th}$ Generation Core network (5GC) using a 5GC-compatible network interface protocol such as carrier Ethernet protocols, or some other suitable protocol. Network connectivity may be provided to/from the access node 1700 via a fiber optic or wireless backhaul. The CN interface circuitry 1712 may include one or more dedicated processors or FPGAs to communicate using one or more of the aforementioned protocols. In some implementations, the CN interface circuitry 1712 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Examples

In the following sections, further exemplary embodiments are provided.

Example 1 includes a method of operating a base station, the method comprising: receiving a first message that includes a contention resolution identity; generating a code value that is based on the contention resolution identity; and sending a second message that includes the code value.

Example 2 includes the method of example 1 or some other example herein, wherein the method further comprises sending a RAR that includes an uplink grant, and wherein receiving the first message comprises receiving the first message in accordance with the uplink grant.

Example 3 includes the method of example 1 or some other example herein, wherein the method further comprises sending a RAR that includes a TC-RNTI, and wherein generating the code value is based on the contention resolution identity and the TC-RNTI.

Example 4 includes the method of example 2 or 3 or some other example herein, wherein sending the RAR comprises sending the RAR over a PDSCH.

Example 5 includes the method of example 1 or some other example herein, wherein the method further comprises receiving a random access preamble, and wherein generating the code value is based on the contention resolution identity and a random access radio network temporary identifier (RA-RNTI) that is based on at least a timing of the random access preamble.

Example 6 includes the method of example 3 or 5 or some other example herein, wherein generating the code value is performed using a scrambling function.

Example 7 includes the method of example 1 or some other example herein, wherein the first message includes a CCCH SDU that includes the contention resolution identity.

Example 8 includes the method of example 1 or some other example herein, wherein the method comprises sending downlink control information (DCI) that indicates a downlink resource allocation for the second message and includes cyclic redundancy (CRC) bits, and wherein the CRC bits of the DCI are scrambled by a radio network temporary identifier.

Example 9 includes the method of example 8 or some other example herein, wherein the method further comprises receiving a random access preamble, and the RNTI is based on at least a timing of the random access preamble.

Example 10 includes the method of example 5 or 9 or some other example herein, wherein receiving the random access preamble comprises receiving the random access preamble over a PRACH.

Example 11 includes the method of example 1 or some other example herein, wherein the second message includes a nonce value, and wherein generating the code value is based on the contention resolution identity and the nonce value.

Example 12 includes the method of example 1-3, 5, 7-9, or 11 or some other example herein, wherein generating the code value is performed using a hash function.

Example 13 includes the method of example 1-3, 5, 7-9, and 11 or some other example herein, wherein receiving the first message occurs over a PUSCH.

Example 14 includes the method of example 1-3, 5, 7-9, and 11 or some other example herein, wherein sending the second message occurs over a PDSCH.

Example 15 includes a method of operating a user equipment, the method comprising: sending a first message that includes a contention resolution identity; receiving a second message that includes a first code value; generating a second code value that is based on the contention resolution identity; and comparing the first code value with the second code value.

Example 16 includes the method of example 15 or 28 or some other example herein, wherein the method further comprises receiving a RAR that includes an uplink grant, and wherein sending the first message comprises sending the first message in accordance with the uplink grant.

Example 17 includes the method of example 15 or some other example herein, wherein the method further comprises receiving a RAR that includes a TC-RNTI, and wherein generating the second code value is based on the contention resolution identity and the TC-RNTI.

Example 18 includes the method of example 16 or 17 or some other example herein, wherein receiving the RAR comprises receiving the RAR over a PDSCH.

Example 19 includes the method of example 15 or 28 or some other example herein, wherein the method further comprises sending a random access preamble, and wherein generating the second code value is based on the contention resolution identity and a RA-RNTI that is based on at least a timing of the random access preamble.

Example 20 includes the method of example 15 or 28 or some other example herein, wherein the first message includes a CCCH SDU that includes the contention resolution identity.

Example 21 includes the method of example 15 or 28 or some other example herein, wherein the method comprises receiving DCI that indicates a downlink resource allocation for the second message and includes CRC bits, and wherein the CRC bits of the DCI are scrambled by a RNTI.

Example 22 includes the method of example 21 or 28 or some other example herein, wherein the method further comprises sending a random access preamble, and the RNTI is based on at least a timing of the random access preamble.

Example 23 includes the method of example 19 or 22 or 28 or some other example herein, wherein sending the random access preamble comprises sending the random access preamble over a PRACH.

Example 24 includes the method of example 15 or some other example herein, wherein the second message includes a nonce value, and wherein generating the second code value is based on the contention resolution identity and the nonce value.

Example 25 includes the method of example 15-17, 19-22, or 24 or some other example herein, wherein generating the second code value is performed using a hash function.

Example 26 includes the method of example 15-17, 19-22, 24, or 28 or some other example herein, wherein sending the first message occurs over a PUSCH.

Example 27 includes the method of example 15-17, 19-22, 24, or 28 or some other example herein, wherein receiving the second message occurs over a PDSCH.

Example 28 includes a method of operating a user equipment, the method comprising: sending a first message that includes a contention resolution identity; receiving a second message that includes a first code value; descrambling the first code value to obtain a second code value; and comparing the second code value with the contention resolution identity.

Example 29 includes a base station comprising processing circuitry to receive a first message that includes a user equipment public key and a signature; generate a session key, wherein the session key is based on the user equipment public key and a second public key; use the generated session key to determine that the signature is valid; and send a second message, wherein the second message is based on the generated session key and the signature, and memory coupled with the processing circuitry, the memory to store the user equipment public key and the second public key.

Example 30 includes the base station of example 29 or some other example herein, wherein the processing circuitry is further to use the generated session key to encrypt the second message.

Example 31 includes the base station of example 29 or some other example herein, wherein the processing circuitry is further to broadcast the second public key in a SIB.

Example 32 includes the base station of example 29 or some other example herein, wherein the processing circuitry is further to receive a random access preamble; and in response to receiving the random access preamble, send a random access response that includes the second public key.

Example 33 includes the base station of example 29 or some other example herein, wherein the processing circuitry is further to send DCI that indicates a downlink resource allocation for the second message and includes CRC bits, and wherein the CRC bits of the DCI are scrambled by a RA-RNTI that is based on at least a timing of the random access preamble.

Example 34 includes the base station of example 29 or some other example herein, wherein the processing circuitry is further to send a RAR that includes an uplink grant, and wherein the processing circuitry is to receive the first message in accordance with the uplink grant.

Example 35 includes the base station of any of examples 29-34 or some other example herein, wherein the processing circuitry is to generate the session key by executing an elliptic-curve Diffie-Hellman (ECDH) algorithm.

Example 36 includes the base station of any of examples 29-34 or some other example herein, wherein the processing circuitry is to receive the first message over a PUSCH.

Example 37 includes the base station of any of examples 29-34 or some other example herein, wherein the processing circuitry is to send the second message over a PDSCH.

Example 38 includes a user equipment comprising processing circuitry to send a random access preamble; receive a RAR; generate a session key, wherein the session key is based on a user equipment public key and a network public key; create a signature that is based on the session key; and send a first message that includes the user equipment public key and the signature, and memory coupled with the processing circuitry, the memory to store the user equipment public key and the network public key.

Example 39 includes the user equipment of example 38 or some other example herein, wherein the processing circuitry is further to receive a second message and to use the generated session key to decrypt the received second message.

Example 40 includes the user equipment of example 39 or some other example herein, wherein the processing circuitry is to receive the second message over a PDSCH.

Example 41 includes the user equipment of example 38 or some other example herein, wherein the processing circuitry is further to receive the network public key in a SIB.

Example 42 includes the user equipment of example 38 or some other example herein, wherein the processing circuitry is further to receive the network public key in the RAR.

Example 43 includes the user equipment of example 38 or some other example herein, wherein the RAR includes an uplink grant, and wherein the processing circuitry is to send the first message in accordance with the uplink grant.

Example 44 includes the user equipment of example 38 or some other example herein, wherein the processing circuitry is further to receive DCI that indicates a downlink resource allocation for the second message and includes CRC bits, and wherein the CRC bits of the DCI are scrambled by a RA-RNTI that is based on at least a timing of the random access preamble.

Example 45 includes the user equipment of any of examples 38-44 or some other example herein, wherein the processing circuitry is to generate the session key by executing an ECDH algorithm.

Example 46 includes the user equipment of any of examples 38-44 or some other example herein, wherein the processing circuitry is to send the first message over a PUSCH.

Example 47 includes one or more computer-readable media having instructions that, when executed by one or more processors, cause a user equipment to generate a signature, wherein the signature is based on an identity of the user equipment and a RNTI; and send a first message that includes the generated signature.

Example 48 includes the one or more computer-readable media of example 47 or some other example herein, wherein the instructions, when executed by the one or more processors, cause the user equipment to send a random access preamble, wherein the RNTI is based on a timing of the random access preamble.

Example 49 includes the one or more computer-readable media of example 47 or some other example herein, wherein the instructions, when executed by the one or more processors, cause the user equipment to receive a RAR, wherein the RAR includes the RNTI.

Example 50 includes the one or more computer-readable media of example 49 or some other example herein, wherein the RAR includes an uplink grant for scheduling a transmission over a PUSCH, and wherein the instructions, when executed by one or more processors, cause the user equipment to send the first message over the PUSCH in accordance with the uplink grant.

Example 51 includes the one or more computer-readable media of example 47 or some other example herein, wherein the first message also includes a contention resolution identity, and wherein the signature is included in an information element of the first message.

Example 52 includes the one or more computer-readable media of any of examples 47-51 or some other example herein, wherein the instructions, when executed by the one or more processors, cause the user equipment to receive a second message that includes the signature.

Example 53 includes one or more computer-readable media having instructions that, when executed by one or more processors, cause a base station to receive a first message that includes a signature, and use an identity of a user equipment and an RNTI to verify the signature.

Example 54 includes the one or more computer-readable media of example 53 or some other example herein, wherein the instructions, when executed by the one or more processors, cause the base station to receive a random access preamble, wherein the RNTI is based on a timing of the random access preamble.

Example 55 includes the one or more computer-readable media of example 53 or some other example herein, wherein the instructions, when executed by the one or more processors, cause the base station to send a RAR, wherein the RAR includes the RNTI.

Example 56 includes the one or more computer-readable media of example 55 or some other example herein, wherein the RAR includes an uplink grant for scheduling a transmission over a PUSCH, and wherein the instructions, when executed by one or more processors, cause the base station to receive the first message over the PUSCH in accordance with the uplink grant.

Example 57 includes the one or more computer-readable media of example 53 or some other example herein, wherein the first message also includes a contention resolution identity, and wherein the signature is included in an information element of the first message.

Example 58 includes the one or more computer-readable media of any of examples 53-57 or some other example herein, wherein the instructions, when executed by the one or more processors, cause the base station to send a second message that includes the signature.

Example 59 may include an apparatus comprising means to perform one or more elements of a method described in or related to any of examples 1-58, or any other method or process described herein.

Example 60 may include one or more non-transitory computer-readable media comprising instructions to cause an electronic device, upon execution of the instructions by one or more processors of the electronic device, to perform one or more elements of a method described in or related to any of examples 1-58, or any other method or process described herein.

Example 61 may include an apparatus comprising logic, modules, or circuitry to perform one or more elements of a method described in or related to any of examples 1-58, or any other method or process described herein.

Example 62 may include a method, technique, or process as described in or related to any of examples 1-58, or portions or parts thereof.

Example 63 may include an apparatus comprising: one or more processors and one or more computer-readable media comprising instructions that, when executed by the one or more processors, cause the one or more processors to perform the method, techniques, or process as described in or related to any of examples 1-58, or portions thereof.

Example 64 may include a signal as described in or related to any of examples 1-58, or portions or parts thereof.

Example 65 may include a datagram, information element, packet, frame, segment, PDU, or message as described in or related to any of examples 1-58, or portions or parts thereof, or otherwise described in the present disclosure.

Example 66 may include a signal encoded with data as described in or related to any of examples 1-58, or portions or parts thereof, or otherwise described in the present disclosure.

Example 67 may include a signal encoded with a datagram, IE, packet, frame, segment, PDU, or message as described in or related to any of examples 1-58, or portions or parts thereof, or otherwise described in the present disclosure.

Example 68 may include an electromagnetic signal carrying computer-readable instructions, wherein execution of the computer-readable instructions by one or more processors is to cause the one or more processors to perform the method, techniques, or process as described in or related to any of examples 1-58, or portions thereof.

Example 69 may include a computer program comprising instructions, wherein execution of the program by a processing element is to cause the processing element to carry out the method, techniques, or process as described in or related to any of examples 1-58, or portions thereof.

Example 70 may include a signal in a wireless network as shown and described herein.

Example 71 may include a method of communicating in a wireless network as shown and described herein.

Example 72 may include a system for providing wireless communication as shown and described herein.

Example 73 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
   generating a random access preamble for transmission to a base station;
   generating a first message that includes a contention resolution identity for transmission to the base station;
   identifying a second message, received from the base station, that includes a first value;
   generating a second value that is based at least in part on a plurality of parameters, wherein the plurality of parameters includes the contention resolution identity, a random access radio network temporary identifier (RA-RNTI), and a nonce value, the RA-RNTI being based at least in part on a timing of the random access preamble; and comparing the first value with the second value to determine whether a random access procedure was successful.

2. The method of claim 1, wherein the method further comprises identifying a random access response (RAR) that includes an uplink grant received from the base station, and wherein the first message is to be transmitted in accordance with the uplink grant.

3. The method of claim 1, wherein the method further comprises identifying a random access response (RAR), received from the base station, that includes a temporary cell radio network temporary identifier (TC-RNTI), and wherein the plurality of parameters further includes the TC-RNTI.

4. The method of claim 1, wherein the first message includes a common control channel (CCCH) service data unit (SDU) that includes the contention resolution identity.

5. The method of claim 1, wherein the method further comprises:

identifying downlink control information (DCI), received from the base station, that indicates a downlink resource allocation for the second message and includes cyclic redundancy check (CRC) bits, wherein the CRC bits of the DCI are scrambled by a radio network temporary identifier (RNTI) that is based at least in part on the timing of the random access preamble.

6. The method of claim 1, wherein generating the second value is performed using a hash function.

7. The method of claim 1, further comprising:

identifying a first public key of the base station;

generating a shared session key based on the first public key and a second public key of a user equipment (UE); and generating a signature based at least in part on the shared session key, wherein the first message includes the signature.

8. The method of claim 1, further comprising:

generating a signature based at least in part on an identity of a user equipment and the RA-RNTI, wherein the first message includes the signature.

9. One or more non-transitory computer-readable media having instructions that, when executed, cause processing circuitry to:

generate a random access preamble for transmission to a base station;

generate a first message that includes a contention resolution identity for transmission to the base station;

identify a second message, received from the base station, that includes a first value;

generate a second value that is based at least in part on a plurality of parameters, wherein the plurality of parameters includes the contention resolution identity, a random access radio network temporary identifier (RA-RNTI), and a nonce value, the RA-RNTI being based at least in part on a timing of the random access preamble; and compare the first value with the second value to determine whether a random access procedure was successful.

10. The one or more non-transitory computer-readable media of claim 9, wherein the instructions, when executed, further cause the processing circuitry to identify a random access response (RAR) that includes an uplink grant received from the base station, and wherein the first message is to be transmitted in accordance with the uplink grant.

11. The one or more non-transitory computer-readable media of claim 9, wherein the instructions, when executed, further cause the processing circuitry to identify a random access response (RAR), received from the base station, that includes a temporary cell radio network temporary identifier (TC-RNTI), and wherein the plurality of parameters further includes the TC-RNTI.

12. The one or more non-transitory computer-readable media of claim 9, wherein the first message includes a common control channel (CCCH) service data unit (SDU) that includes the contention resolution identity.

13. The one or more non-transitory computer-readable media of claim 9, wherein the instructions, when executed, further cause the processing circuitry to:

identify downlink control information (DCI), received from the base station, that indicates a downlink resource allocation for the second message and includes cyclic redundancy check (CRC) bits, wherein the CRC bits of the DCI are scrambled by a radio network temporary identifier (RNTI) that is based at least in part on the timing of the random access preamble.

14. The one or more non-transitory computer-readable media of claim 9, wherein to generate the second value is performed using a hash function.

15. An apparatus comprising:

processing circuitry to:

identify a random access preamble received from a user equipment (UE)

identify a first message, received from the UE, that includes a contention resolution identity; and generate a second message that includes a first value for transmission to the UE, the first value to be compared to a second value generated based at least in part on a plurality of parameters, wherein the plurality of parameters includes the contention resolution identity, a random access radio network temporary identifier (RA-RNTI), and a nonce value, the RA-RNTI based at least in part on a timing of a random access preamble; and interface circuitry coupled with the processing circuitry, the interface circuitry to communicatively couple the processing circuitry with a component of a device.

16. The apparatus of claim 15, wherein the processing circuitry is further to generate a random access response (RAR) that includes an uplink grant for transmission to the UE, wherein the first message is received in accordance with the uplink grant.

17. The apparatus of claim 15, wherein the processing circuitry is further to generate a random access response (RAR) that includes a temporary cell radio network temporary identifier (TC-RNTI), wherein the plurality of parameters further includes the TC-RNTI.

* * * * *